United States Patent
Ishimoto

(10) Patent No.: US 8,213,276 B2
(45) Date of Patent: Jul. 3, 2012

(54) RECORDING APPARATUS AND CONTROL METHOD

(75) Inventor: Tsutomu Ishimoto, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 12/951,922

(22) Filed: Nov. 22, 2010

(65) Prior Publication Data

US 2011/0134729 A1 Jun. 9, 2011

(30) Foreign Application Priority Data

Dec. 4, 2009 (JP) ................................. 2009-276155

(51) Int. Cl.
*G11B 7/00* (2006.01)
(52) U.S. Cl. ............... 369/44.29; 369/53.14; 369/44.32; 369/94
(58) Field of Classification Search ............... 369/53.13, 369/44.32, 94, 103, 44.29, 44.37, 44.26
See application file for complete search history.

(56) References Cited

U.S. PATENT DOCUMENTS

| | | | | |
|---|---|---|---|---|
| 6,118,739 A | * | 9/2000 | Kishinami et al. | 369/53.14 |
| 6,147,944 A | * | 11/2000 | Kwon et al. | 369/44.32 |
| 6,370,094 B1 | * | 4/2002 | Kishinami et al. | 369/44.32 |
| 2001/0012249 A1 | * | 8/2001 | Fukamachi | 369/44.32 |
| 2004/0213108 A1 | * | 10/2004 | Fujiune | 369/53.14 |
| 2008/0106987 A1 | * | 5/2008 | Chao | 369/53.14 |
| 2010/0083295 A1 | * | 4/2010 | Eto et al. | 369/275.4 |
| 2010/0177620 A1 | * | 7/2010 | Shimamoto | 369/112.23 |

FOREIGN PATENT DOCUMENTS

JP  2008-135144  6/2008
JP  2008-176902  7/2008

* cited by examiner

*Primary Examiner* — Thang Tran
(74) *Attorney, Agent, or Firm* — Wolf, Greenfield & Sacks, P.C.

(57) ABSTRACT

A recording apparatus for performing information recording using formation of marks by focusing a first light with an objective lens at a given position in a recording layer included in an optical disc recording medium, includes: a rotation driving unit; a focus servo control unit for condensing a second light on a reflection film and for controlling a position of the objective lens; a recording position setting unit for setting an information recording position of the first light in a focus direction; a tracking servo control unit for controlling a position of the objective lens; an eccentricity amount estimating unit for estimating an eccentricity amount of the optical disc recording medium; and an eccentricity estimation amount acquisition control unit for acquiring an eccentricity estimation amount for each rotation angle within one revolution of the disc.

9 Claims, 15 Drawing Sheets

| ROTATION ANGLE | ECCENTRICITY ESTIMATION AMOUNT |
|---|---|
| 1° | 0.10 |
| 2° | 0.11 |
| ⋮ | ⋮ |
| 360° | 0.10 |

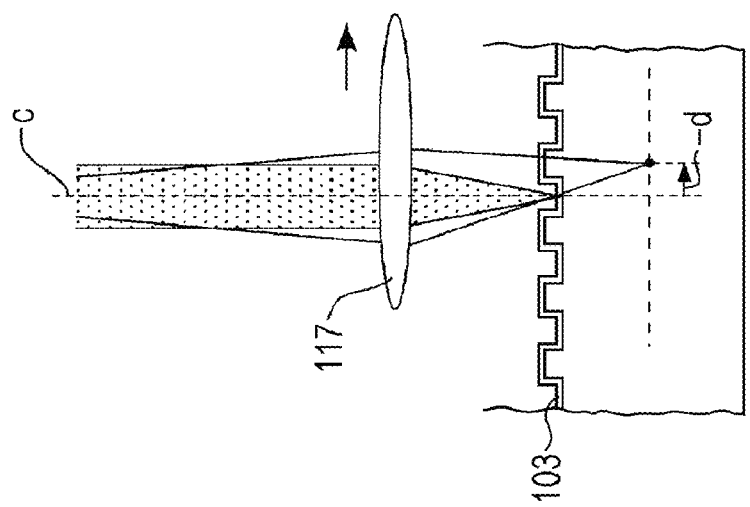
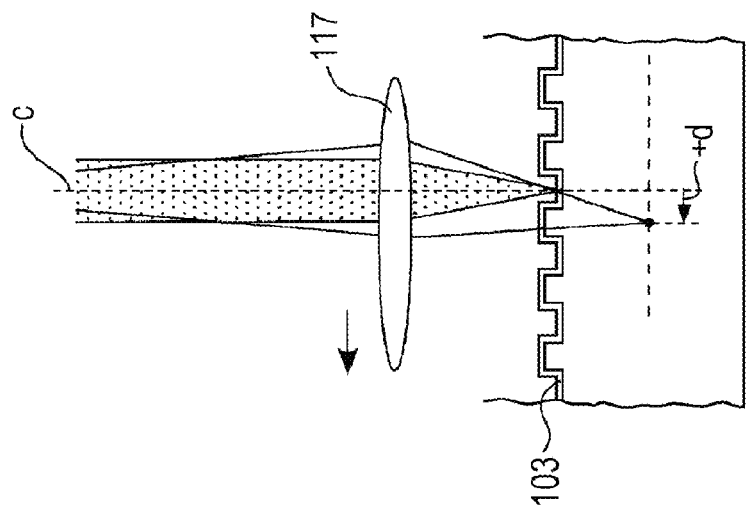
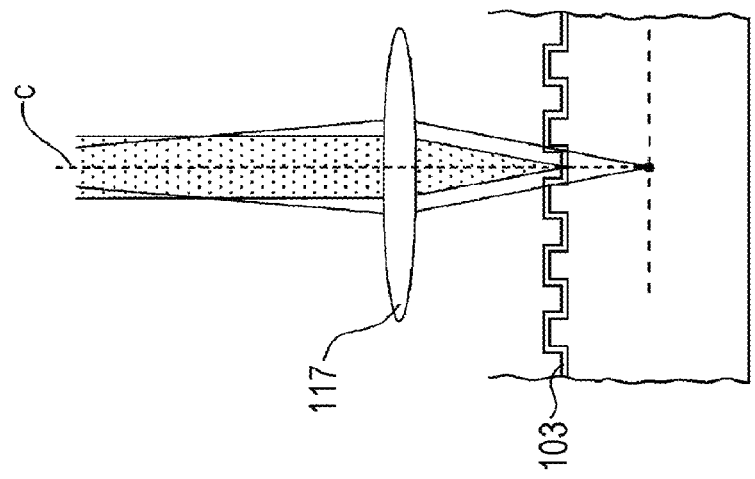

US 8,213,276 B2

RECORDING APPARATUS AND CONTROL METHOD

BACKGROUND OF THE INVENTION

1. Field of the Invention

The present invention relates to a recording apparatus for recording information using mark formation performed by focusing a first light beam at a given position in a recording layer included in an optical disc recording medium with an objective lens, and a control method used in the recording apparatus.

2. Description of the Related Art

As optical recording media for recording and reproducing signals by light illumination, for example, so-called optical discs such as CDs (Compact Discs), DVDs (Digital Versatile Discs), and BDs (Blu-ray Discs: trade mark) have been popularized.

With regard to the next-generation optical recording media of the currently popularized optical recording media such as CDs, DVDs, and BDs, first, the applicant has previously proposed a so-called bulk recording-type optical medium as disclosed in Japanese Unexamined Patent Application Publication No. 2008-135144 and Japanese Unexamined Patent Application Publication No. 2008-176902.

Here, bulk recording is, for example, a technique for performing multi-layer recording in a bulk layer 102 by performing laser light illumination while sequentially changing focal positions in an optical recording medium (a bulk-type recording medium 100) having at least a cover layer 101 and the bulk layer (recording layer) 102 as illustrated in FIG. 11, thereby achieving an increase in recording capacity.

For the bulk recording, in Japanese Unexamined Patent Application Publication No. 2008-135144, a recording technique called a microhologram method is disclosed.

The microhologram method is, as illustrated in FIGS. 12A and 12B, mainly classified into a positive-type microhologram method and a negative-type microhologram method.

In the microhologram method, as a recording material of the bulk layer 102, a so-called hologram recording material is used. As the hologram recording material, for example, photopolymerizable polymer or the like is widely used.

The positive-type microhologram method is, as illustrated in FIG. 12A, a technique for condensing two opposing beams (beam A and beam B) at the same position to form a fine fringe (hologram) which becomes a recording mark.

In addition, the negative-type microhologram method illustrated in FIG. 12B is, in the idea reverse to the positive-type microhologram method, a technique for erasing a fringe which is formed in advance using laser light illumination to use the erasure portion as a recording mark.

FIGS. 13A and 13B are diagrams for explaining the negative-type microhologram method.

In the negative-type microhologram method, before performing a recording operation, as illustrated in FIG. 13A, an initialization process for forming a fringe in the bulk layer 102 is performed in advance. Specifically, as illustrated in FIG. 13A, beams C and D are illuminated by parallel light to be opposed to form the fringes on the entirety of the bulk layer 102.

As such, after the fringe is formed in advance by the initialization process, information recording is performed by forming erasure marks as illustrated in FIG. 13B. Specifically, by performing laser light illumination according to the recording information in a state where laser beams are focused at an arbitrary layer position, the information recording using erasure marks is performed.

In addition, the applicant also proposes, as a bulk recording technique different from the microhologram method, a recording technique for forming voids (holes) as recording marks, for example, as disclosed in Japanese Unexamined Patent Application Publication No. 2008-176902.

The void recording method is a technique for performing laser light illumination on the bulk layer 102 made of a recording material such as photopolymerizable polymer at a relatively high power, thereby recording holes (voids) in the bulk layer 102. As disclosed in Japanese Unexamined Patent Application Publication No. 2008-176902, the hole portions formed as described above become portions having different refractive indexes from other portions in the bulk layer 102, and reflectance of light at the boundaries thereof can be enhanced. Therefore, the hole portions function as recording marks, thereby implementing information recording using the formation of hole marks.

In such void recording methods, since holograms are not formed, recording is done when light illumination is performed on one side. That is, unlike the positive-type microhologram method, two beams are not condensed at the same position to form recording marks.

In addition, in comparison to the negative-type microhologram method, there is an advantage in that an initialization process is not performed.

Moreover, in Japanese Unexamined Patent Application Publication No. 2008-176902, an example in which the light for pre-curing before recording is illuminated when void recording is to be performed is described. However, recording of the voids can be made even when illumination of the light for pre-curing is omitted.

However, although various recording techniques as described above have been proposed for bulk recording-type (simply referred to as bulk-type) optical disc recording media, a recording layer (bulk layer) of such a bulk-type optical disc recording medium does not have an explicit multi-layer structure in the sense that, for example, a plurality of reflection films are formed. That is, the bulk layer 102 is not provided with a reflection film and a guiding groove that a typical multi-layer disc has, for each recording layer.

Therefore, in the structure of the bulk-type recording medium 100 illustrated in FIG. 11 as it is, during recording without marks being formed, focus servo or tracking servo may not be performed.

Accordingly, in practice, the bulk-type recording medium 100 is provided with a reflection surface (reference surface) which is the reference to have a guiding groove as illustrated in FIG. 14.

Specifically, guiding grooves (position guiding elements) such as pits or grooves are formed on a lower surface side of the cover layer 101, and a selective reflection film 103 is formed thereon. In addition, on the lower side of the cover layer 101 on which the selective reflection film 103 is formed, as an intermediate layer 104 in FIG. 14, for example, the bulk layer 102 is laminated with an adhesive material such as UV-curable resin.

In addition, in this medium structure, the bulk-type recording medium 100 is, as illustrated in FIG. 15, illuminated with a second laser light as a laser light for position control separately from a laser light (first laser light) for recording (or reproducing) marks.

As illustrated in FIG. 17, the first and second laser lights illuminate the bulk-type recording medium 100 via a common objective lens.

Here, if the second laser light reaches the bulk layer 102, there is a concern that the second laser light has an adverse effect on mark recording in the bulk layer 102. Accordingly, in a bulk recording method according to the related art, a laser light having a wavelength band different from that of the first laser light is used as the second laser light, and the selective reflection film 103 which has wavelength selectivity in that it reflects the second laser light and transmits the first laser light is provided as a reflection film formed on a guide groove formation surface (reference surface).

On the above-described premise, operations performed during mark recording mark in the bulk-type recording medium 100 will be described with reference to FIG. 15.

First, when multi-layer recording is to be performed on the bulk layer 102 without a guiding groove or a reflection film being formed, which layer position marks have to be recorded in the bulk layer 102 in a depth direction is set in advance. In the FIG. 15, a case is exemplified where as layer positions at which the marks are to be formed (mark formation layer: also called an information recording layer) in the bulk layer 102, first to fifth information recording layers L1 to L5, totaling 5 information recording layers (mark formation layers) L, are set. As illustrated in FIG. 15, the layer position of the first information recording layer L1 is set to a position at a first offset of of-L1 in a focus direction (depth direction) from the selective reflection film 103 (reference surface) provided with guiding grooves. In addition, the layer positions of the second, third, fourth, and fifth information recording layers L2, L3, L4, and L5 are respectively set to positions at second, third, fourth, and fifth offsets of of-L2, of-L3, of-L4, and of-L5 from the selective reflection film 103.

During recording in which marks are not formed yet, focus servo or tracking servo may not be performed on the layer positions as objects in the bulk layer 102 on the basis of reflected light of the first laser light. Therefore, during recording, focus servo control and tracking servo control of the objective lens are performed on the basis of the reflected light of the second laser light as a position control light so that a spot position of the second laser light follows the guiding grooves on the selective reflection film 103.

However, the first laser light which is a mark recording light has to reach the bulk layer 102 formed under the selective reflection film 103. Accordingly, in this optical system, separately from a focus mechanism of the objective lens, a first laser focus mechanism is provided for individually adjusting a focal position of the first laser light.

Here, an internal configuration example of the recording apparatus of the bulk-type recording medium 100 including the mechanism for individually adjusting the focal position of the first laser light is illustrated in FIG. 16.

In FIG. 16, a first laser diode 111 denoted by LD1 in FIG. 16 is a light source of the first laser light, and a second laser diode 119 denoted by LD2 is a light source of the second laser light. As understood from the above description, the first and second laser diodes 111 and 119 respectively are adopted to emit laser lights having wavelength bands different from each other.

As illustrated in FIG. 16, the first laser light emitted by the first laser diode 111 is incident on the first laser focus mechanism constituted by a fixed lens 113, a movable lens 114, and a lens driving unit 115 via a collimation lens 112. As the movable lens 114 is driven by the lens driving unit 115 in a direction parallel to an optical axis of the first laser light, collimation of the first laser light incident on an objective lens 117 in FIG. 16 is changed, so that the focal position of the first laser light can be adjusted separately from a change in focal position that is caused by driving the objective lens 117.

The first laser light transmitted via the first laser focus mechanism is incident on a dichroic mirror 116 adopted to transmit light having the same wavelength band as that of the first laser light and reflect light having different wavelength bands.

As illustrated in FIG. 16, the first laser light transmitting the dichroic mirror 116 illuminates the bulk-type recording medium 100 via an objective lens 118. The objective lens 117 is held to be displaced in the focus direction and a tracking direction by a biaxial actuator 118.

In addition, the second laser light emitted by the second laser diode 119 transmits a beam splitter 121 via the collimation lens 120 and is incident on the above-mentioned dichroic mirror 116. The second laser light reflects from the dichroic mirror 117 and is incident on the objective lens 117 so that its optical axis is aligned with the optical axis of the first laser light transmitting the dichroic mirror 116.

The second laser light incident on the objective lens 117 is focused on the selective reflection film 103 (reference surface) of the bulk-type recording medium 100 as the biaxial actuator 118 is driven under focus servo control by a servo circuit 125 described later. In addition, the position of the second laser light in the tracking direction is allowed to follow the guiding groove provided in the selective reflection film 103 as the biaxial actuator 118 is driven by the servo circuit 125 under the tracking servo control.

The reflected light of the second laser light from the selective reflection film 103 is reflected from the dichroic mirror 116 via the objective lens 117 and is then reflected again from the beam splitter 121. The reflected light of the second laser light from the beam splitter 121 is condensed on a detection surface of a photodetector 123 via a condenser lens 122.

A matrix circuit 124 generates focusing and tracking error signals on the basis of light sensing signals detected by the photodetector 123 and supplies the error signals to the servo circuit 125.

The servo circuit 125 generates a focus servo signal and a tracking servo signal from the error signals. As the above-mentioned biaxial actuator 118 is driven on the basis of the focus servo signal and the tracking error signal, the focus servo control and the tracking servo control of the objective lens 117 are realized.

Here, when mark recording is to be performed on a given information recording layer L as an object selected from among the information recording layers L set in advance in the bulk-type recording medium 100, the operation of the lens driving unit 115 is controlled to change the focal position of the first laser light by an amount of the offset of corresponding to the selected information recording layer L.

Specifically, setting of such an information recording position is controlled by, for example, a controller 126 that controls the entire recording apparatus. That is, the operation of the lens driving unit 115 is controlled by the controller 126 on the basis of an amount of the offset of-Lx set in advance according to the information recording layer Lx as the object, thereby setting the information recording position (focal position) of the first laser light to the information recording layer Lx which is the object.

In addition, during recording, the tracking servo of the first laser light is automatically performed as the tracking servo control of the objective lens 117 is performed by the servo circuit 125 on the basis of the reflected light of the second laser light as described above. Specifically, the spot position of the first laser light in the tracking direction is controlled to be immediately under the guiding groove provided in the selective reflection film 103.

Moreover, when the bulk-type recording medium 100 on which the mark recording is performed in advance is reproduced, the position of the objective lens 117 may not be controlled on the basis of the reflected light of the second laser light unlike in recording. That is, during reproduction, the focus servo control and the tracking servo control of the objective lens 117 may be performed on mark rows as objects formed on the information recording layer L as a reproduction object, on the basis of the reflected light of the first laser light.

As described above, in the bulk recording method, in the bulk-type recording medium 100, the first laser light as the mark recording light and the second laser light as the position control light are illuminated via the common objective lens 117 (to be combined in the same optical axis). Thereafter, the focus servo control and the tracking servo control of the objective lens 117 are performed on the basis of the reflected light of the second laser light, so that the focus servo and the tracking servo of the first laser light can be performed even though the guiding grooves are not formed on the bulk layer 102.

SUMMARY OF THE INVENTION

However, as illustrated in FIG. 16, when the configuration in which the focal position (information recording position) of the first laser light is changed by the focus mechanism which is separated from the objective lens 117 is employed, there is a problem in that as illustrated in FIGS. 17A to 17C, the information recording position is deviated from its original position due to eccentricity of the bulk-type recording medium 100.

FIG. 17A illustrates an ideal state of the bulk-type recording medium 100 in which there is no eccentricity. FIG. 17B illustrates a case where eccentricity (referred to as (+) direction eccentricity) occurs in the left direction on the paper plane (referred to as the outer peripheral direction). FIG. 17C illustrates a case where eccentricity (referred to as (−) direction eccentricity) occurs in the right direction on the paper plane (referred to as the inner peripheral direction).

First, the center axis c in FIGS. 17A to 17C is a center axis set to design an optical system, and in the ideal state illustrated in FIG. 17A, the center of the objective lens 117 is aligned with the center axis c.

Accordingly, when the (+) direction eccentricity occurs as illustrated in FIG. 17B, the objective lens 117 is driven in the (+) direction to follow the eccentricity by the tracking servo control. That is, the center of the objective lens 117 is shifted to the (+) direction with respect to the center axis c of the optical system.

Here, as illustrated in FIG. 17B, since the second laser light is incident on the objective lens 117 as a parallel light, even though there is a shift of the objective lens 117 from the center axis c as described above, a change in the focal position of the second laser light in the tracking direction does not occur. For this, the first laser light is incident on the objective lens 117 so as not to be parallel therewith to be focused on the selected information recording layer L in the bulk layer 102 on the lower layer side of the selective reflection film 103 as described above, by the shift of the objective lens 117 in the (+) direction as described above, as illustrated in FIG. 17B, the focal position (information recording position) of the first laser light is changed in the (+) direction by the eccentricity amount (a deviation amount +d in FIG. 17B)

In addition, when the (−) direction eccentricity as illustrated in FIG. 17C occurs, the objective lens 117 is shifted in the (−) direction to follow the eccentricity in the (−) direction by the tracking servo control, so that the information recording position of the first laser light is changed in the (−) direction by the eccentricity amount as illustrated in FIG. 17C (a deviation amount −d in FIG. 17C).

The configuration of the recording apparatus for the bulk-type recording medium 100 described above with reference to FIG. 16 is implemented so that:
  the first and second laser lights are illuminated via the common objective lens 117,
  the focus servo control of the objective lens 117 is performed to focus the second laser light on the reference surface (the selective reflection film 103) of the bulk-type recording medium 100,
  the focal position (the information recording position) of the first laser light is adjusted by changing the collimation of the first laser light incident on the objective lens 117, and
  the tracking servo control of the objective lens 117 is performed to allow the focal position of the second laser light to follow the guiding groove provided in the reference surface (selective reflection film 103) in the bulk-type recording medium 100.

In this configuration, there is a problem in that the information recording position of the first laser light is deviated in the tracking direction due to the eccentricity of the disc.

Here, depending on a degree of the eccentricity or setting of a track pitch (an interval between the guiding grooves formed therein), there may be a case where the information recording positions of adjacent guiding grooves may be overlapped. In this case, a recording signal is not correctly reproduced.

As a measure to avoid this problem, the track pitch is widened to be equal to or greater than the variation of the information recording position caused by the eccentricity.

However, in this technique, since the eccentricity amount is uncertain, there is a problem in that the amount the track pitch is to be widened by is uncertain. In addition, there is a concern that a reduction in recording capacity is caused by the widening of the track pitch.

In addition, as another technique to avoid this problem, a system in which the disc is not removable may be employed.

Here, examples of causes of the eccentricity may include an error between an inner diameter of the disc and a clamp diameter of a spindle motor. In the manufacturing processes, since making the error therebetween zero may be difficult, eccentricity is inevitable. In addition, even if the error therebetween is zero, the center of a recording signal on the reference surface of the disc and the center of the spindle axis of the recording and reproduction apparatus may not be aligned with each other, so that eccentricity occurs in this case. Here, when the system in which a disc is not removable is employed, the influence of eccentricity becomes the same, so that the problem of the overlapping of recording positions can be avoided. Accordingly, the track pitches can be closed-up, thereby achieving an increase in the recording capacity by an amount to be closed-up.

However, in this method, replacement of the disc may not be possible. Therefore, for example, replacement of only the disc when the disc is imperfect may not be possible. In addition, it may be difficult to read data recorded by a certain recording apparatus with a different recording apparatus. Due to this fact, convenience is compromised.

A recording apparatus according to an embodiment of the invention has the following configuration.

The recording apparatus for performing information recording using formation of marks by focusing a first light with an objective lens at a given position in a recording layer included in an optical disc recording medium, the recording apparatus and includes a rotation driving unit for rotating the optical disc recording medium.

In addition, the recording apparatus includes a focus servo control unit for condensing a second light which is different from the first light via the objective lens on a reflection film provided with a position guiding element in the optical disc recording medium, and for controlling a position of the objective lens so that the second light is focused on the reflection film on the basis of the reflected light of the second light condensed on the reflection film.

In addition, the recording apparatus includes a recording position setting unit for setting an information recording position of the first light in a focus direction by changing the collimation of the first light incident on the objective lens.

In addition, the recording apparatus includes a tracking servo control unit for controlling the position of the objective lens to allow the focal position of the second light to follow the position guiding element on the basis of the reflected light of the second light.

In addition, the recording apparatus includes an eccentricity amount estimating unit for estimating an eccentricity amount of the optical disc recording medium.

Moreover, the recording apparatus includes an eccentricity estimation amount acquisition control unit for acquiring an eccentricity estimation amount for each rotation angle within one revolution of the disc by rotating the optical disc recording medium and performing an operation of estimating the eccentricity amount using the eccentricity amount estimating unit.

According to the embodiment of the invention, with the configuration in which
- the first and second lights are illuminated via the common objective lens,
- the focus servo control of the objective lens is performed to focus the second light on the reflection film provided in the optical disc recording medium,
- the information recording position (the focal position) of the first light is set (adjusted) by changing the collimation of the first light incident on the objective lens, and
- the tracking servo control of the objective lens is performed to allow the focal position of the second laser light to follow the position guiding element provided in the reflection film (the reference surface) of the optical disc recording medium, the eccentricity estimation amount can be acquired for each rotation angle within one revolution of the disc. Accordingly, deviation of the information recording position of the first light in the tracking direction can be appropriately corrected on the basis of the information on the acquired eccentricity estimation amount.

According to the embodiment of the invention, in the case where the first and second lights are illuminated via the common objective lens, the focus servo control of the objective lens is performed to focus the second light on the reflection film provided in the optical disc recording medium, the information recording position of the first light is set by changing the collimation of the first light incident on the objective lens, and the tracking servo control of the objective lens is performed to allow the focal position of the second laser light to follow the position guiding element provided in the reflection film (the reference surface) of the optical disc recording medium, the eccentricity estimation amount is acquired for each rotation angle within one revolution of the disc. Therefore, deviation of the information recording position of the first light in the tracking direction which is caused by eccentricity can be appropriately corrected on the basis of the information on the acquired eccentricity estimation amount.

By appropriately correcting the deviation of the information recording position as described above, the track pitches (intervals between the position guiding elements formed in the tracking direction) can be closed-up, thereby achieving an increase in recording capacity.

In addition, according to the embodiment described above, the disc is allowed to be removable. Therefore, it is possible to prevent the compromising of convenience that occurs in the case where a system in which a disc such as a hard disc drive (HDD) is not removable is employed.

BRIEF DESCRIPTION OF THE DRAWINGS

FIGS. 17A to 17C are diagrams illustrating principles of deviations of the information recording position in a tracking direction which are caused by eccentricity of the disc.

DESCRIPTION OF THE PREFERRED EMBODIMENTS

Hereinafter, exemplary embodiments (hereinafter, referred to as embodiments) of the invention will be described.

The description is provided in the following order:
1. Examples of Optical Disc Recording Medium as Recording Object
2. Servo Control 3. Internal Configuration of Recording Apparatus according to Embodiment 4. Eccentricity Amount Estimation Technique and Information Recording Position Correction Technique according to Embodiment 4-1. Overview of Correction Technique 4-2. Specific Techniques for Estimating Eccentricity Amount 4-3. Specific Techniques for Information Recording Position Correction 4-4. Examples of Specific Configurations and Processes for Eccentricity Amount Estimation and Information Recording Position Correction 4-5. Conclusion of Embodiments 5. Modified Example

1. Examples of Optical Disc Recording Medium as Recording Object

Figure 1:
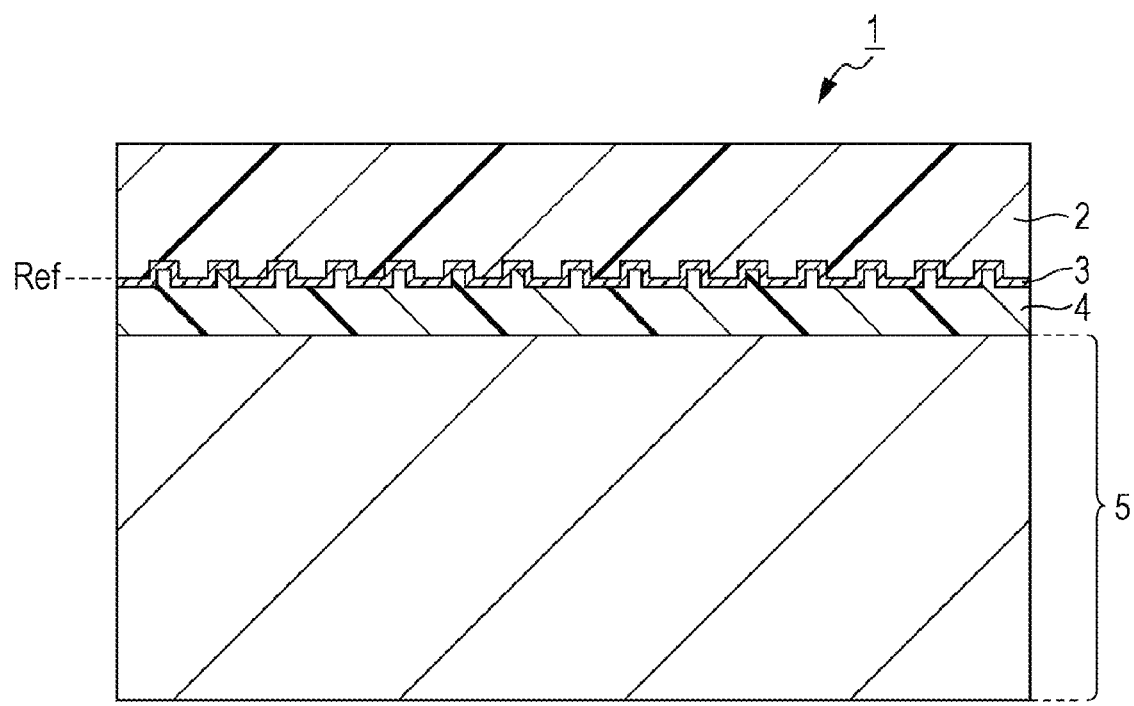
FIG. 1 is a cross-sectional view of a structure of an optical disc recording medium which is a recording object according to an embodiment.

FIG. 1 is a cross-sectional view of a structure of an optical disc recording medium which is a recording object of a recording apparatus according to an embodiment.

The optical disc recording medium which is the recording object according to the embodiment is regarded as a so-called bulk recording-type optical disc recording medium, and hereinafter, is referred to as a bulk-type recording medium 1.

The bulk-type recording medium 1 as the optical disc recording medium is illuminated with a laser light while being rotated by a recording apparatus for mark recording (information recording).

Moreover, disc-shaped recording media for recording (and reproducing) information by light illumination are generally referred to an optical disc recording media.

As illustrated in FIG. 1, in the bulk-type recording medium 1, a cover layer 2, a selective reflection film 3, an intermediate layer 4, and a bulk layer 5 are formed in this order from the top layer side.

Here, in this specification, the "top layer side" indicates a top layer side when a surface on which a laser light is incident by a recording apparatus (recording apparatus 10) according to an embodiment described later is regarded as a top surface.

In addition, in this specification, a "depth direction" is used. The "depth direction" indicates a direction aligned with an up and down direction (vertical direction) (that is, a direction parallel with a direction of laser light being incident by the recording apparatus: focus direction) according to the definition of the "top layer side".

In the bulk-type recording medium 1, the cover layer 2 is made of a resin such as polycarbonate or acrylic resin, and as illustrated in FIG. 1, on a lower surface side thereof, a cross-sectional shape of unevenness accompanied by formation of guiding grooves for guiding the recording position is given.

A guiding groove is formed as a continuous groove (groove) or a pit row. For example, when the guiding groove is formed as the pit row, position information (absolute position information: in this example, rotation angle information and radial position information are represented) is recorded by a combination of lengths of pits and lands. On the other hand, when the guiding groove is regarded as the groove, the groove is periodically meandered (wobbled) to record position information on the basis of period information on the meanders.

The cover layer 2 is generated by injection molding using a stamper in which such guiding grooves (uneven pattern) are formed.

In addition, on a lower surface side of the cover layer 2 provided with the guiding grooves, the selective reflection film 3 is formed.

Here, as described above, in the bulk recording method, besides a recording light (first laser light) for performing mark recording in the bulk layer 5 as a recording layer, a servo light (position control light, also referred to as a second laser light) for obtaining an error signal during tracking or focusing on the basis of the guiding grooves as described above is additionally illuminated.

Here, if the servo light reaches the bulk layer 5, there is a concern that the servo light has an adverse effect on the mark recording performed on the bulk layer 5. Therefore, a reflection film that has selectivity in that it reflects the servo light and transmits the recording light is used.

From the past, in the bulk recording method, as the recording light and the servo light, laser lights having different wavelength bands are used. For this, as the selective reflection film 3, a selective reflection film that reflects light having the same wavelength band as the servo light and transmits light having other wavelength bands is used.

On a lower layer side of the selective reflection film 3, for example, the bulk layer 5 as the recording layer is laminated (adhered) with the intermediate layer 4 made of an adhesive material such as a UV-curable resin therebetween.

As a material (recording material) of the bulk layer 5, for example, a suitable and optimal material may be employed depending on the employed bulk recording method such as the positive-type microhologram method, the negative-type microhologram method, or the void recording method described above.

Moreover, the method of the mark recording to be performed on the optical disc recording medium as an object according to the embodiment of the invention is not particularly limited, and any method in the category of bulk recording methods may be employed.

Here, in the bulk-type recording medium 1 having the above-described configuration, the selective reflection film 3 provided with the uneven cross-sectional shape pattern accompanied by the above-mentioned formation of the guiding grooves becomes a reflection surface which is a reference corresponding to position control of the first laser light based on the second laser light. Correspondingly, hereinafter, a surface on which the selective reflection film 3 is formed is referred to as a reference surface Ref.

2. Servo Control

Next, servo control during recording to be performed on the bulk-type recording medium 1 as an object will be described with reference to FIG. 2.

Figure 2:
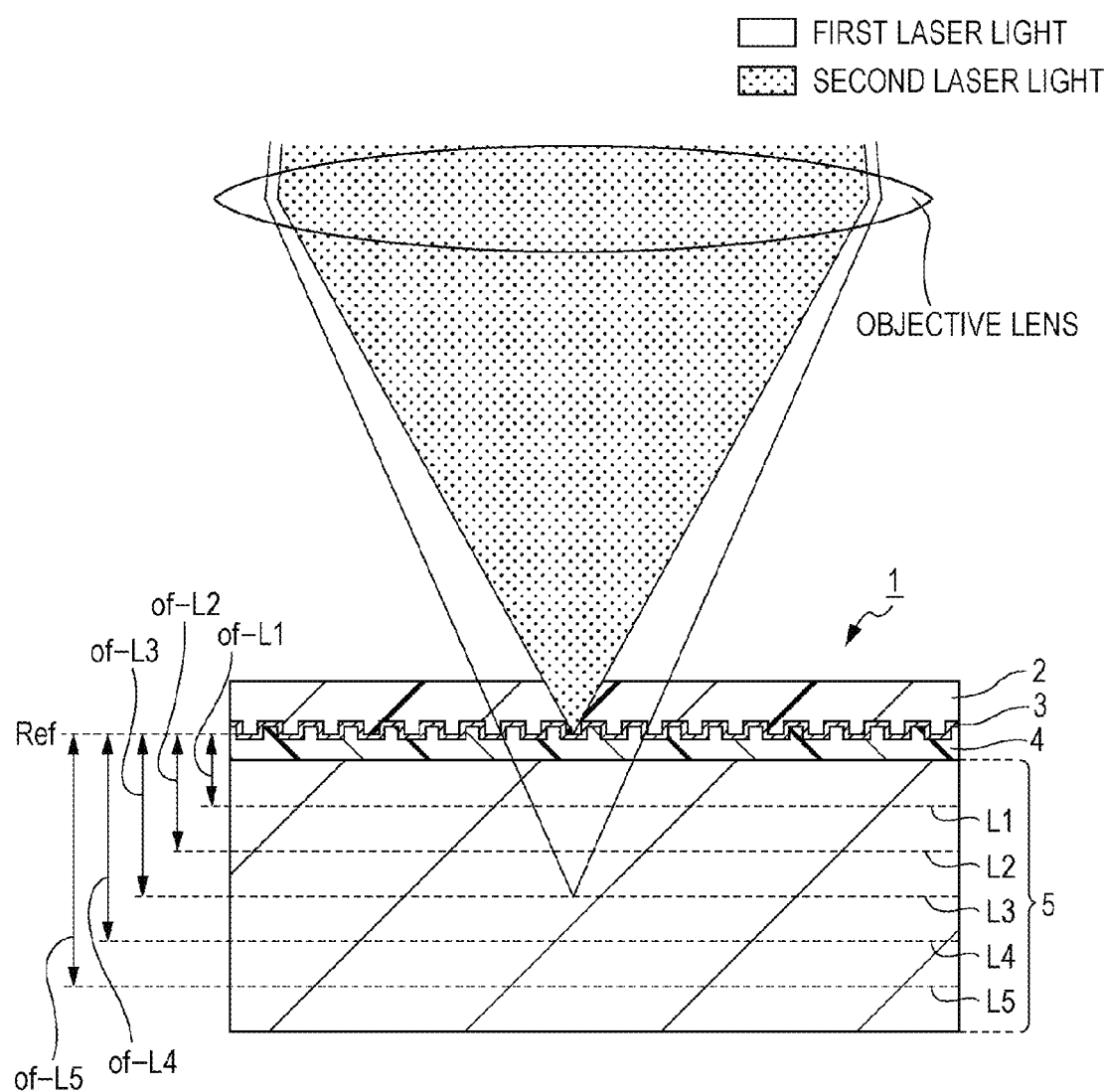
FIG. 2 is a diagram illustrating servo control during recording.

In FIG. 2, as described above, the bulk-type recording medium 1 is illuminated with, in addition to the laser light (the first laser light) as the mark recording light, the laser light (the second laser light) as the servo light having a different wavelength band from the aforementioned laser light.

Figure 4:
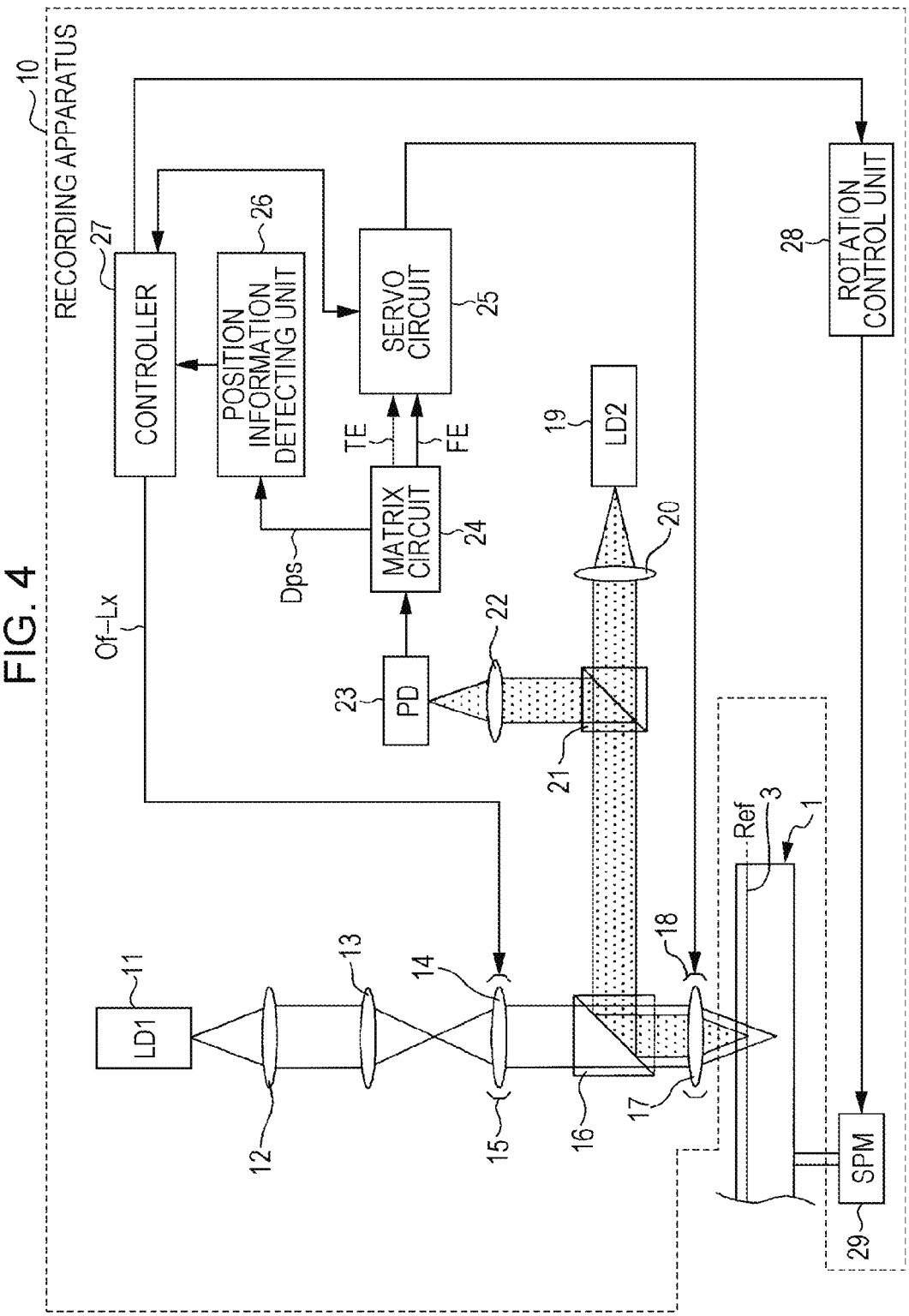
FIG. 4 is a diagram illustrating an internal configuration of a recording apparatus according to the embodiment.

As illustrated in FIG. 2, the first and second laser lights illuminate the bulk-type recording medium 1 via a common objective lens (the objective lens 17 in FIG. 4).

Here, as illustrated in FIG. 1, in the bulk layer 5, unlike multi-layer discs for current optical discs such as DVDs (Digital Versatile Discs) or BDs (Blu-ray Discs: trade mark), a reflection surface having guiding grooves formed as pits or grooves is not provided at each layer position which is a recording object. Accordingly, during recording in which marks are not yet formed, focus servo or tracking servo for the first laser light is not able to be performed using the reflected light of the first laser light itself.

From this point of view, during recording to be performed on the bulk-type recording medium 1, both the tracking servo and the focus servo for the first laser light are performed using the reflected light of the second laser light as the servo light.

Specifically, with regard to the focus servo of the first laser light during the recording, first, a focus mechanism for the first laser light (a set of the fixed lens 13, the movable lens 14, and the lens driving unit 15, which will be described later in FIG. 4) which can individually change only the focal position of the first laser light is provided, and then the focus mechanism for the first laser light is controlled on the basis of offsets of from the selective reflection film 3 (reference surface Ref) which is a reference as illustrated in FIG. 2.

Here, as described above, the first and second laser lights illuminate the bulk-type recording medium 1 via the common objective lens. In addition, focus servo of the second laser light is performed by controlling the objective lens using the reflected light of the second laser light from the reference surface Ref (selective reflection film 3).

As described above, the first and second laser lights illuminate via the common objective lens, and the focus servo of the second laser light is performed by controlling the objective lens on the basis of the reflected light of the second laser light from the reference surface Ref so that the focal position of the first laser light follows variations in the surface of the bulk-type recording medium 1. Then, the focal position of the first laser light is shifted by the focus mechanism for the first laser light described above by values of the offsets of, thereby condensing the first laser light at a given depth position in the bulk layer 5.

In FIG. 2, as an example of each offset of when 5 mark formation layers (referred to as information recording layers) L are set in the bulk layer 5, a case where a first offset of-L1 corresponding to a layer position of a first information recording layer L1, a second offset of-L2 corresponding to a layer position of a second information recording layer L2, a third offset of-L3 corresponding to a layer position of a third information recording layer L3, a fourth offset of-L4 corresponding to a layer position of a fourth information recording layer L4, and a fifth offset of-L5 corresponding to a layer position of a fifth information recording layer L5 are set is shown. By driving the above-mentioned focus mechanism for the first laser using the values of the offsets of, the formation position of marks in the depth direction may be appropriately selected from among the layer position of the first information recording layer L1, the layer position of the second information recording layer L2, the layer position of the third information recording layer L3, the layer position of the fourth information recording layer L4, the layer position of the fifth information recording layer L5.

In addition, the tracking servo for the first laser light during recording is realized by performing tracking servo control of the objective lens using the reflected light of the second laser light from the reference surface Ref on the basis of the fact that the first and second laser lights illuminate via the common objective lens as described above.

Specifically, the focal position of the first laser light in the tracking direction is controlled to follow the position immediately below the guiding groove as the tracking servo control for driving the objective lens is performed to allow the focal position of the second laser light to follow the guiding groove provided in the selective reflection film 3 on the basis of the reflected light of the second laser light.

In addition, just for confirmation, the above description is made on the premise of an ideal state without eccentricity of the disc.

Moreover, servo control during reproduction may be performed as follows.

Figure 3:
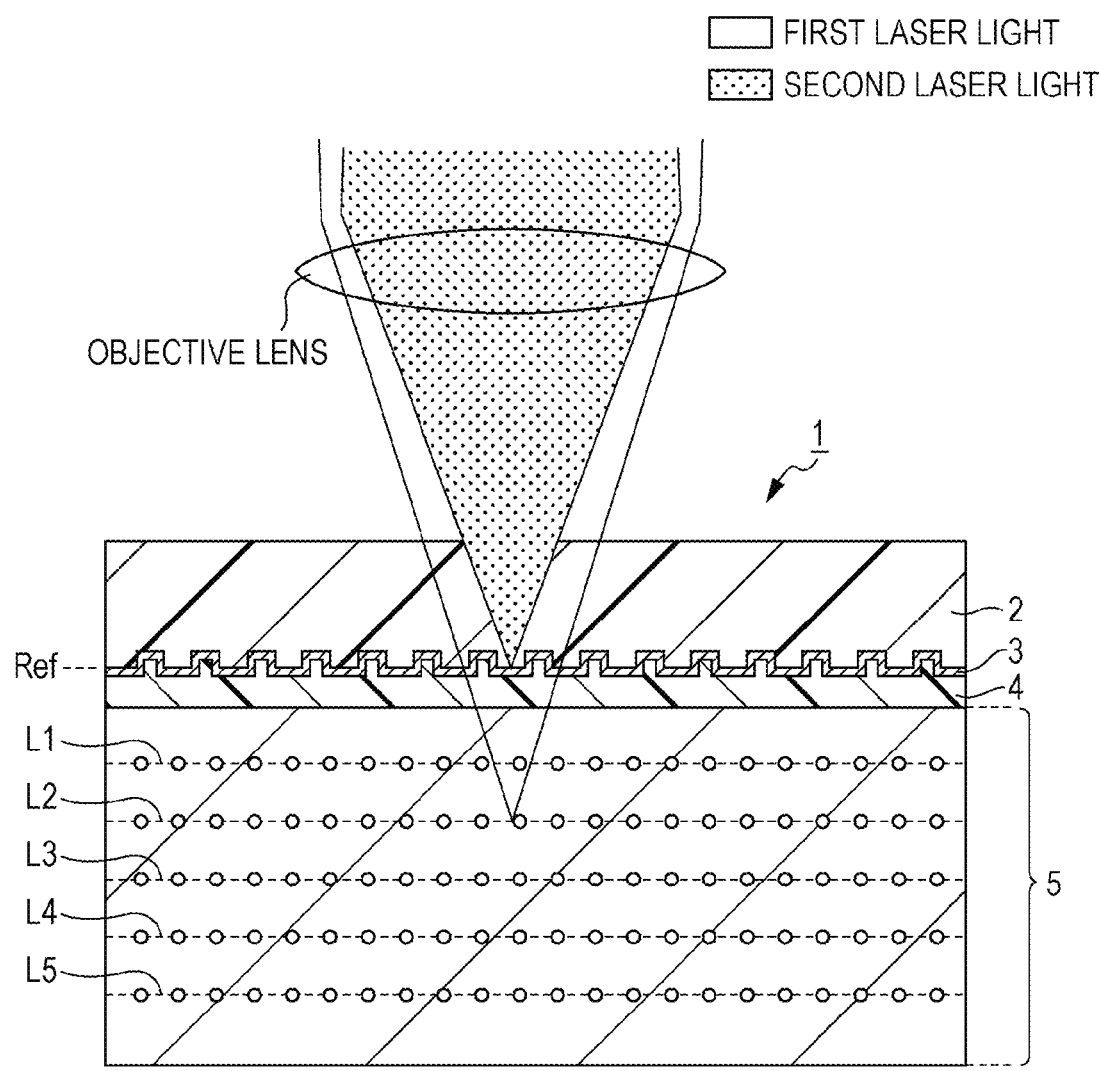
FIG. 3 is a diagram illustrating servo control during reproduction.

FIG. 3 is a diagram illustrating the servo control during reproduction. In addition, in FIG. 3, as a state of the bulk-type recording medium 1 during reproduction, a state where mark rows are recorded in all the first to fifth information recording layers L1 to L5 in advance is illustrated.

During reproduction of the bulk-type recording medium 1 in which the mark rows are already formed, the focus servo control for the first laser light may be performed on the mark rows recorded in advance as objects. Therefore, the focus servo control for the first laser light during the reproduction is performed by controlling the objective lens on the basis of the reflected light of the first laser light so that the focal position follows the mark row (the information recording layer L) which is a reproduction object.

In addition, during reproduction, even the tracking servo control for the first laser light is performed by driving the objective lens on the basis of the reflected light of the first laser light. That is, the tracking servo control is performed so that the spot position of the first laser light follows the mark row formed on the information recording layer L as an object.

Moreover, as understood by the above description, during reproduction of the information recorded in the bulk layer 5, emission of the second laser light as well as the servo control of the second laser light may not be necessary.

Here, in order to access a reproduction starting position, absolute position information recorded in the reference surface Ref has to be read. Therefore, before completing access to the reproduction starting position, the focus tracking servo for the second laser light is performed. Specifically, before completing the access to the reproduction starting position, the focus servo control of the second laser light is performed by driving the objective lens on the basis of the reflected light of the second laser light so that the second laser light is focused on the reference surface Ref. In addition, the tracking servo control of the second laser light before completing the access is performed by driving the objective lens on the basis of the reflected light of the second laser light so that the spot position of the second laser light follows the guiding grooves formed on the reference surface Ref.

Moreover, the servo control during reproduction described above is only an example for reference, and the embodiment of the invention is not limited to this technique.

3. Internal Configuration of Recording Apparatus According to an Embodiment

FIG. 4 illustrates an internal configuration of the recording apparatus 10 according to the embodiment for performing recording in the bulk-type recording medium 1 illustrated in FIG. 1.

First, the bulk-type recording medium 1 loaded in the recording apparatus 10 is set so that its center hole is clamped at a given position in the recording apparatus 10, and is held in a state capable of being rotated by a spindle motor (SPM) 29 in FIG. 4.

In addition, the recording apparatus 10 is provided with a first laser diode 11 and a second laser diode 19 which are light sources for illuminating the first and second laser lights to the bulk-type recording medium 1 rotated by the spindle motor 29.

Here, as described above, the first and second laser lights have different wavelengths from each other. In this example, it is assumed that the wavelength of the first laser light is about 405 nm (so-called blue and violet laser light), and the wavelength of the second laser light is about 650 nm (red laser light).

The first laser light emitted by the first laser diode 11 is incident via a collimation lens 12 to become a parallel light and then is incident on an expander (first laser focus mechanism) constituted by a fixed lens 13, a movable lens 14, and a lens driving unit 15. In the expander, the fixed lens 13 is disposed on a closer side to the first laser diode 11 and the movable lens 14 is disposed on a farther side from the first laser diode 11, and the movable lens 14 is driven by the lens driving unit 15 in a direction parallel with the optical axis of the first laser light to change the collimation of the first laser light incident on the objective lens 17 in FIG. 4, thereby performing individual focus control for the first laser light.

The first laser light is incident on a dichroic mirror 16 via the expander. The dichroic mirror 16 is configured so that its selective reflection surface transmits the first laser light and light having the same wavelength band and reflects light having other wavelengths. Therefore, the first laser light incident as described above is transmitted by the dichroic mirror 16.

The first laser light transmitted by the dichroic mirror 16 illuminates the bulk-type recording medium 1 via the objective lens 17 as illustrated.

For the objective lens 17, a biaxial actuator 18 for holding the objective lens 17 to displace it in the focus direction (a direction to come in contact with or to be separated from the bulk-type recording medium 1) and in a tracking direction (a direction perpendicular to the focus direction: a radial direction of the bulk-type recording medium 1) is provided.

The biaxial actuator 18 has a focus coil and a tracking coil and applies drive currents to the focus coil and the tracking coil from a servo circuit 25 thereby displacing the objective lens 17 in the focus direction and in the tracking direction.

In addition, the second laser light emitted by the second laser diode 19 is incident via a collimation lens 20 to become a parallel light and transmits a beam splitter 21 to be incident on the dichroic mirror 16.

As described above, since the dichroic mirror 16 is configured to transmit the first laser light and light having the same wavelength band and reflects light having other wavelengths, the second laser light reflects from the dichroic mirror 16 so that its optical axis is bent at 90° as illustrated in FIG. 4 to be aligned with the optical axis of the first laser light thereby being incident on the objective lens 17.

The second laser light incident on the objective lens 17 is focused on the reference surface Ref of the bulk-type recording medium 1 as the operation of the above-mentioned biaxial actuator 18 is controlled under the focus servo control by the servo circuit 25.

In addition, the reflected light of the second laser light that can be obtained as the second laser light illuminates the bulk-type recording medium 1 is incident via the objective lens 17 and is reflected by the dichroic mirror 16 to be incident on the above-mentioned beam splitter 21. The reflected light of the second laser light that is incident on the beam splitter 21 is reflected by the beam splitter 21 and condensed on a detection surface of a photodetector PD 23 by a condenser lens 22.

Here, although not shown in the figure, in practice, the recording apparatus 10 is provided with a slide driving unit for driving an optical head including the entire optical system described above to slide in the tracking direction, and an illumination position of laser light can be displaced in a wide range by driving the optical head using the slide driving unit.

In addition, the recording apparatus 10 is provided as a configuration for recording information in the bulk layer 5 by the first laser light, a recording processing unit for allowing the first laser diode 11 to emit light according to recording data.

A light sensing signal detected by the photodetector 23 is supplied to a matrix circuit 24.

The matrix circuit 24 includes a current-voltage conversion circuit, a matrix operation/amplification circuit, and the like to correspond to output currents from a plurality of light sensing elements as the above-described photodetector 23 and generates signal for matrix operation processing.

Specifically, a focus error signal FE for the focus servo control and a tracking error signal TE for the tracking servo control are generated.

In addition, a position information detection signal Dps for detecting absolute position information recorded on the reference surface Ref is generated.

The position information detection signal Dps generated by the matrix circuit 24 is supplied to a position information detecting unit 26 as illustrated in FIG. 4. The position information detecting unit 26 detects the absolute position information (radial position information and rotation angle information) recorded in the reference surface Ref on the basis of the position information detection signal Dps. The detected absolute position information is supplied to a controller 27.

In addition, the focus error signal FE and the tracking error signal TE generated by the matrix circuit 24 are supplied to the servo circuit 25.

The servo circuit 25 generates a focus servo signal FS and a tracking servo signal TS on the basis of the focus error signal FE and the tracking error signal TE and drives the focus coil and the tracking coil of the biaxial actuator 18 on the basis of the focus servo signal FS and the tracking servo signal TS, thereby performing the focus servo control and the tracking servo control on the objective lens 17.

In addition, the servo circuit 25 turns off a tracking servo loop according to an instruction of the controller 27 to apply a jump pulse to the tracking coil thereby implementing a track jumping operation, or performs pull-in control of the tracking servo and the like. In addition, the servo circuit 25 also performs pull-in control of the focus servo.

In addition, in this example, the servo circuit 25 also has a function estimating the eccentricity amount of the bulk-type recording medium 1, and this will be described later.

A rotation control unit 28 controls the operation of the spindle motor 29 on the basis of the instruction of the controller 27.

The controller 27 is configured as, for example, a CPU (Central Processing Unit) or a microcomputer having a memory (storage device) such as a ROM (Read Only Memory) and performs control processing according to programs stored in, for example, the ROM thereby controlling the entire recording apparatus 10.

Specifically, the controller 27 controls the focal position of the first laser light (selects a recording position in the depth direction) on the basis of the values of the offsets of set to correspond to the respective layer positions in advance as described above with reference to FIG. 2. More specifically, the controller 27 drives the lens driving unit 15 on the basis of the values of the offsets of-Lx set to correspond to the information recording layers Lx as a recording object, thereby selecting (setting) the information recording position in the depth direction.

In addition, in this embodiment, the controller 27 performs controlling to correct deviation of the information recording position that is caused by the eccentricity of the bulk-type recording medium 1 by performing processes illustrated in FIGS. 10A and 10B, and this will be described later.

4. Eccentricity Estimation Amount Technique and Information Recording Position Correction Technique According to Embodiment

4-1. Overview of Correction Technique

Here, as understood from the foregoing description, with regard to the laser light illumination on the bulk-type recording medium 1 according to this embodiment, a configuration in which:
- the first and second laser lights are illuminated via the common objective lens 17,
- the focus servo control of the objective lens 17 is performed to focus the second laser light on the reference surface Ref (the selective reflection film 3) of the bulk-type recording medium 1,
- the information recording position (the focal position) of the first laser light is set (adjusted) by changing the collimation of the first laser light incident on the objective lens 17, and
- the tracking servo control of the objective lens 17 is performed to allow the focal position of the second laser light to follow the guiding groove provided in the reference surface (selective reflection film 3) in the bulk-type recording medium 1.

is employed.

As described above with reference to FIGS. 17A to 17C, when the configuration is employed, eccentricity of the bulk-type recording medium 1 occurs, and thus the information recording position of the first laser light is deviated in the tracking direction.

Specifically, when eccentricity in the outer peripheral direction (displacement of the guiding groove toward the outer periphery: referred to as the (+) direction eccentricity) occurs, the objective lens 17 is shifted toward the outer periphery to follow the eccentricity, so that the information recording position is deviated in the outer peripheral direction from the position in the ideal state without eccentricity (a deviation amount +d in FIG. 17B). On the contrary, when eccentricity in the inner peripheral direction (displacement of the guiding groove toward the inner periphery: referred to as the (−) direction eccentricity) occurs, the objective lens 17 is shifted in the inner peripheral direction to follow the eccentricity, so that the information recording position is deviated in the inner peripheral direction from the position in the ideal state (a deviation amount −d in FIG. 17C).

Here, the value (absolute value) of the deviation amount d is in proportion to an amount of the eccentricity.

In addition, the eccentricity is caused by factors such as warpage of the disc or the like, and the amount of the eccentricity varies within one revolution of the disc.

In order to solve this problem, according to this embodiment, the amount of the eccentricity is measured (estimated) for each rotation angle within one revolution of the disc to correct the information recording position for each rotation angle on the basis of the information on the amount of the eccentricity for the corresponding rotation angle.

Here, as techniques for correcting the deviation of the information recording position in the tracking direction, various techniques may be considered. However, according to this embodiment, a technique for imparting an offset in response to the eccentricity amount to the tracking servo loop to correct the information recording position in the tracking direction may be employed. Specifically, when the (+) direction eccentricity as described above occurs, an offset in the (−) direction in proportion to the amount of eccentricity is applied to the tracking servo loop to cancel the deviation of the information recording position, and when the (−) direction eccentricity occurs, an offset in the (+) direction in proportion to the amount of eccentricity is applied to the tracking servo loop to cancel the deviation of the information recording position.

4-2. Specific Techniques for Estimating Eccentricity Amount

Continuously, an example of a specific technique for measuring (estimating) the eccentricity amount of the disc will be described.

In this example, the eccentricity amount of the disc is estimated on the basis of the tracking error information.

Figure 5:
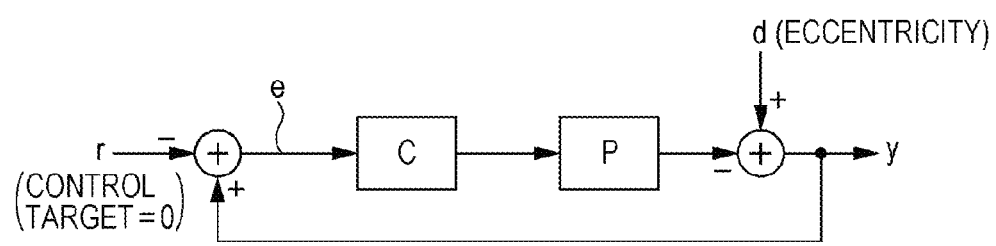
FIG. 5 is a diagram illustrating a model of a tracking servo control system.

FIG. 5 illustrates a model of a tracking servo control system.

In FIG. 5, "r" is a control target value of the tracking servo control, and in this case, r=0. In addition, "e" in FIG. 5 represents a value of a tracking error signal TE.

In addition, "C" in FIG. 5 represents a transfer function corresponding to a tracking servo operation (control operation) as a block and hereinafter is referred to as a block C.

In addition, "P" in FIG. 5 represents a transfer function corresponding to response characteristics of the biaxial actuator 18 and hereinafter is referred to as a block P.

In addition, "d" represents disturbance that may be exerted on the tracking servo control system, and here, corresponds to eccentricity.

In addition, "y" represents an output of the focus servo control system.

As illustrated in FIG. 5, the output y and the value e of the tracking error signal TE in the tracking servo control system are represented by the following expression:

$$-eCP+d=y \qquad \text{[Expression 1]}$$

$$e=y-r \qquad \text{[Expression 2]}$$

Therefore, the eccentricity amount d can be represented from Expressions 1 and 2 by:

$$d=r+(1+CP)e \qquad \text{[Expression 3]}$$

Here, since r=0, the eccentricity amount d is represented by:

$$d=(1+CP)e \qquad \text{[Expression 4]}$$

As represented above, the eccentricity amount d can be obtained by adding the value e of the tracking error signal TE to "CPe" that can be obtained by multiplying the transfer function of the block C and the transfer function of the block P with the tracking error signal TE(e).

Figure 6:
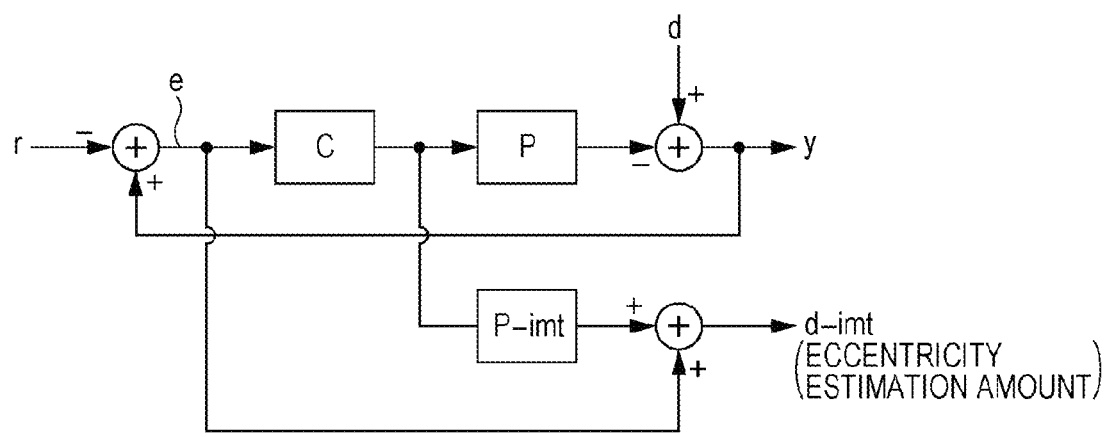
FIG. 6 is a diagram illustrating an eccentricity amount estimation technique according to the embodiment.

However, in the actual configuration, since the output of the block P corresponding to the response characteristics of the biaxial actuator 18 may not be obtained as a numerical value, as represented by a model of FIG. 6, the eccentricity amount is obtained as an eccentricity estimation amount d-imt using an identification model P-imt of the biaxial actuator 18.

That is, as illustrated in FIG. 6, the eccentricity estimation amount d-imt is obtained by:

$$d\text{-}imt=eCP\text{-}imt+e \qquad \text{[Expression 5]}$$

Here, the identification model P-imt (transfer function) of the biaxial actuator 18 is obtained in advance by performing tests using an actual equipment.

Figures 7, 8:
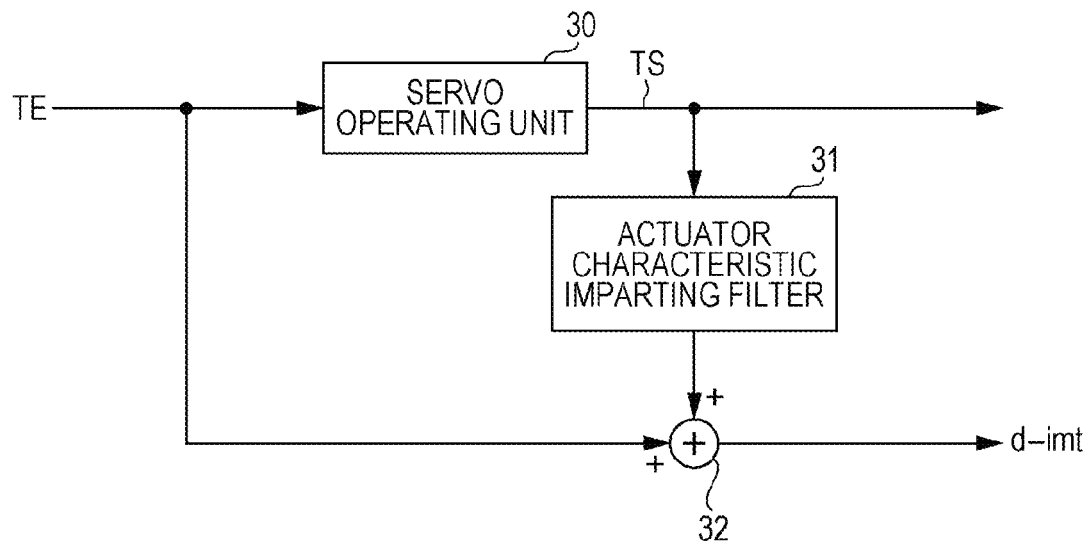
FIG. 7 is a diagram illustrating an example of an actual configuration for obtaining the eccentricity estimation amount by the estimation technique according to the embodiment.
FIG. 8 is a diagram illustrating an example of a data structure of information on correspondence between rotation angle and eccentricity amount.

FIG. 7 is a diagram illustrating an example of an actual configuration for obtaining the eccentricity estimation amount d-imt by Expression 5, and a system for generating the tracking servo signal TS and a system for calculating the eccentricity estimation amount d-imt are extracted from the internal configuration of the servo circuit 25 to be illustrated.

As illustrated in FIG. 7, in the servo circuit 25, a servo operating unit 30 for generating the tracking servo signal TS by performing servo operations (phase compensation, loop gain impartment, and the like) on the tracking error signal TE from the matrix circuit 24 illustrated in FIG. 4 is provided.

In addition, in the servo circuit 25 in this example, as components of the calculating system of the eccentricity estimation amount d-imt, an actuator characteristic imparting filter 31 and an adding unit 32 are provided.

As illustrated in FIG. 7, the actuator characteristic imparting filter 31 inputs the tracking servo signal TS output from the servo operating unit 30 and imparts response characteristics of the biaxial actuator 18 to the tracking servo signal TS. Specifically, filter characteristics (frequency characteristics) corresponding to the transfer function of the above-mentioned identification model P-imt are set in the actuator characteristic imparting filter 31, and the response characteristics of the biaxial actuator 18 are imparted by filtering the tracking servo signal TS on the basis of the filter characteristics.

The adding unit 32 adds to the tracking error signal TE the tracking servo signal TS to which the characteristics are imparted by the actuator characteristic imparting filter 31 as described above.

Accordingly, the eccentricity estimation amount d-imt can be obtained.

4-3. Specific Techniques for Information Recording Position Correction

As described above, in this example, estimation of the eccentricity amount is performed for each rotation angle within one revolution of the disc. In other words, the value of the eccentricity estimation amount d-imt as described above is acquired for each rotation angle of the bulk-type recording medium 1.

Controlling for acquiring the value of the eccentricity estimation amount d-imt for each rotation angle is performed by the controller 27 illustrated in FIG. 4.

Specifically, the controller 27 acquires rotation angle information supplied from the position information detecting unit 26 and acquires the value of the eccentricity estimation amount d-imt calculated by the servo circuit 25 as described above in a state where the focus servo control and the tracking servo control are performed by the servo circuit 25 while the bulk-type recording medium 1 is rotated by the spindle motor 29. In addition, a correspondence between the value of the eccentricity estimation amount d-imt and each piece of the acquired rotation angle information is made to generate rotation angle-eccentricity amount correspondence information as illustrated in FIG. 8.

As illustrated in FIG. 8, in this example, the rotation angle-eccentricity amount correspondence information is regarded as information in which a correspondence is made between a value of the eccentricity estimation amount d-imt and a rotation angle every rotation angle of 1°.

The controller 27 stores the rotation angle-eccentricity amount correspondence information in, for example, an internal memory.

Here, acquisition of the eccentricity estimation amount d-imt within one revolution of the disc may be performed in advance during a startup operation when the bulk-type recording medium 1 is loaded. Otherwise, the acquisition may be performed immediately before starting a recording operation (until the recording operation is actually started after a trigger for starting recording is generated).

In this example, it is assumed in providing the following description that the acquisition of the eccentricity estimation amount d-imt within one revolution of the disc is performed during the startup operation.

As the value of the eccentricity estimation amount d-imt within one revolution of the disc is acquired as illustrated in FIG. 8, correction of the information recording position of the first light can be suitably performed for each rotation angle on the basis of the acquired eccentricity estimation amount d-imt.

That is, the correction in this case is performed using the value of the eccentricity estimation amount d-imt corresponding to the rotation angle of the actual bulk-type recording medium 1 on the basis of the rotation angle information detected from the bulk-type recording medium 1 during recording.

Specifically, the controller 27 sequentially outputs to the servo circuit 25 the values of the eccentricity estimation amounts d-imt corresponding to the rotation angles of the current bulk-type recording medium 1 on the basis of the rotation angle information input from the position information detecting unit 26 and the rotation angle-eccentricity amount correspondence information as illustrated in FIG. 8, in response to the trigger for starting the recording operation.

The servo circuit 25 sequentially applies the offsets in response to the supplied values of the eccentricity estimation amounts d-imt to, for example, the tracking error signal TE.

Accordingly, the tracking servo loop in this case is applied with the offset in response to the value of the eccentricity estimation amount d-imt acquired in advance to correspond to the rotation angle of the bulk-type recording medium 1 at that time point, and as a result, deviation of the information recording position in the tracking direction can be appropriately corrected for each rotation angle.

Moreover, applying the offset in response to the eccentricity estimation amount d-imt to the tracking servo loop, in other words, corresponds to changing the control target value r of the tracking servo described with reference to FIG. 5 in response to the value of the eccentricity estimation amount d-imt.

4-4. Examples of Specific Configurations and Processes for Eccentricity Amount Estimation and Information Recording Position Correction FIG. 9 is a diagram illustrating an example of a specific configuration for correcting the information recording position by applying an offset in response to a value of the eccentricity estimation amount d-imt to the tracking servo loop.

Figure 9:
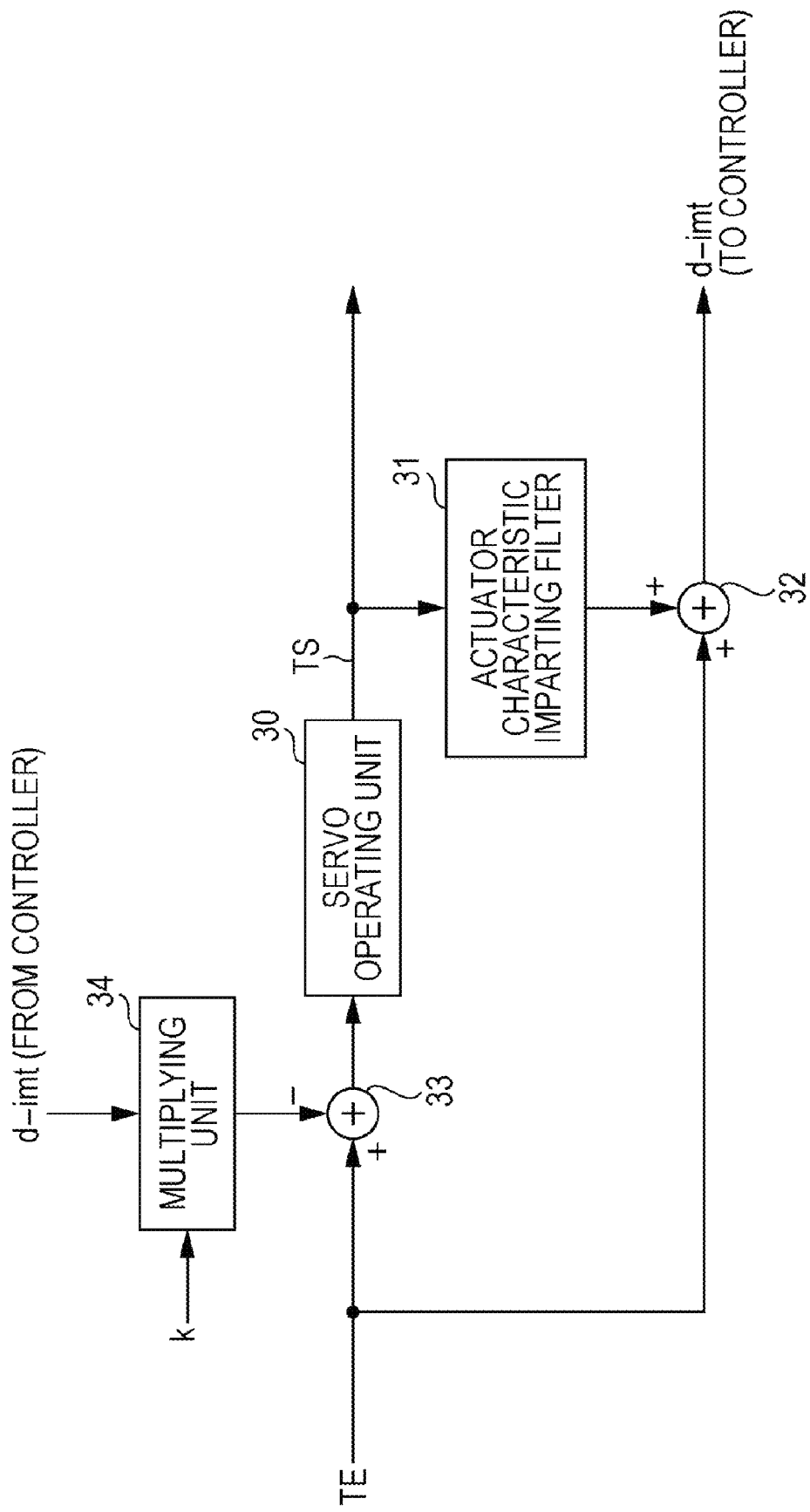
FIG. 9 is a diagram illustrating an example of a specific configuration for correcting an information recording position by applying an offset in response to a value of eccentricity estimation amount to a tracking servo loop.

In addition, in FIG. 9, a system for imparting an offset in response to the eccentricity estimation amount d-imt along with a system for generating the tracking servo signal TS and a system for calculating the eccentricity estimation amount d-imt are extracted from the internal configuration of the servo circuit 25 illustrated in FIG. 4 to be illustrated.

In addition, in FIG. 9, like elements described in FIG. 7 are denoted by like reference numerals, and description thereof will be omitted.

As illustrated in FIG. 9, in the servo circuit 25, the tracking error signal TE is input to the servo operating unit 30 via a subtracting unit 33 in FIG. 9.

In addition, in FIG. 9, the subtracting unit 33 is inserted between a branch point of the tracking error signal TE toward the adding unit 32 described with reference to FIG. 7 and the servo operating unit 30, so that the tracking error signal TE before being input to the subtracting unit 33 is input to the adding unit 32. However, in the servo circuit 25, the insertion position of the subtracting unit 33 may be disposed before the branch point.

Just for confirmation, the calculation of the eccentricity estimation amount d-imt is not performed during a period in which the offset is imparted (during an operation of correcting the information recording position, that is, during the recording operation). Therefore, whether the subtracting unit 33 is provided before or after the branch point does not have any effect on the operation of calculating the eccentricity estimation amount d-imt.

As illustrated in FIG. 9, the value of the eccentricity estimation amount d-imt applied by the controller 27 during the recording operation as described above is multiplied with a coefficient k by a multiplying unit 34 to be input to the subtracting unit 33.

The subtracting unit 33 subtracts the value of the eccentricity estimation amount d-imt supplied via the multiplying unit 34 from the value of the tracking error signal TE and outputs the resultant to the servo operating unit 30.

Here, just for confirmation, the coefficient k set by the multiplying unit 34 corresponds to a correction gain that determines correction sensitivity of the information recording position, and the value of the coefficient k may be determined by experiments so that deviation of the information recording position is suitably corrected when the output from the multiplying unit 34 is applied to the tracking error signal TE by the subtracting unit 33.

Here, applying an offset to the tracking servo loop in response to the value of the eccentricity estimation amount d-imt as in this example means applying an offset to a tracking position of the second laser light in response to the eccentricity estimation amount d-imt, so that this may have an adverse effect on the tracking servo of the second laser light. Accordingly, the value of the coefficient k has to be set in a range so that an adverse effect such as tracking servo deviation is not given by the correction.

Figure 10A:
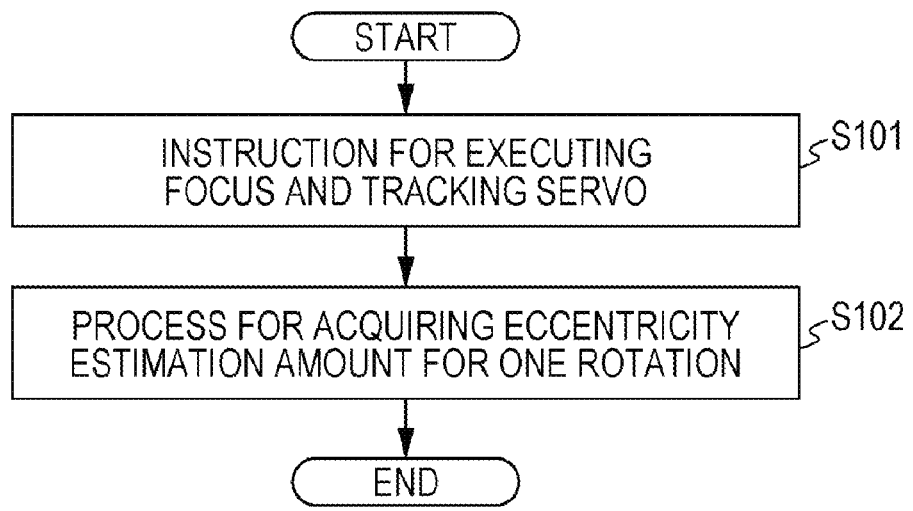
FIGS. 10A and 10B are flowcharts illustrating flows of specific processes performed to realize the eccentricity amount estimation technique and the information recording position correction technique according to the embodiment.
Figure 10B:
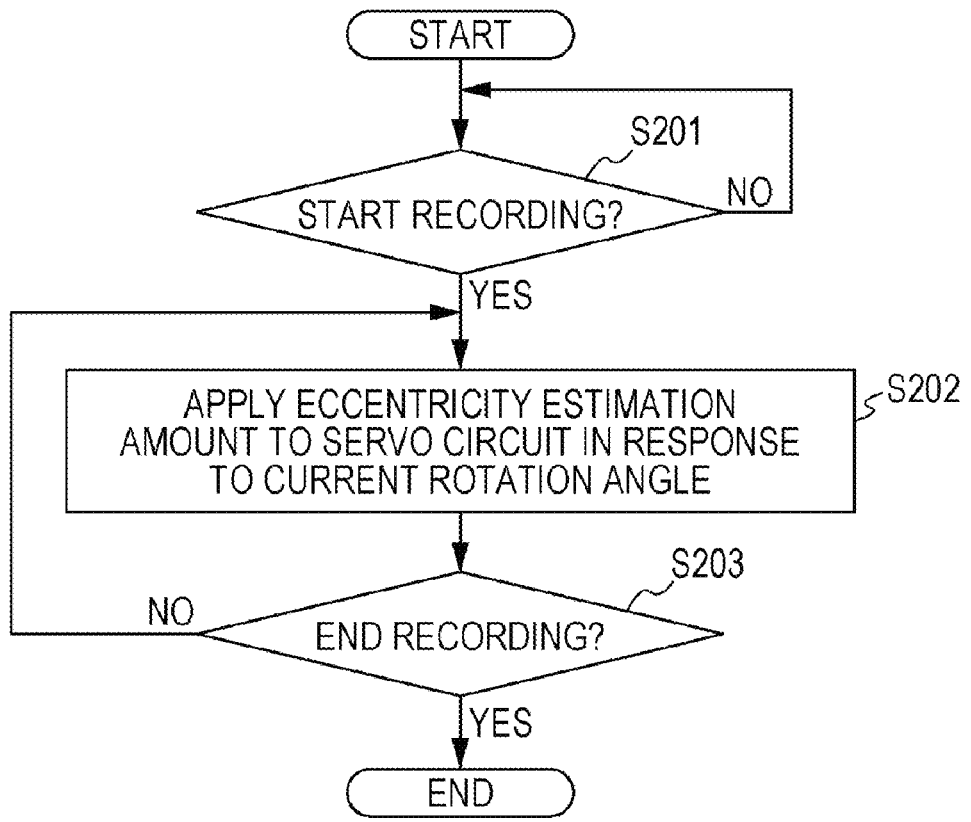
Figure 11:
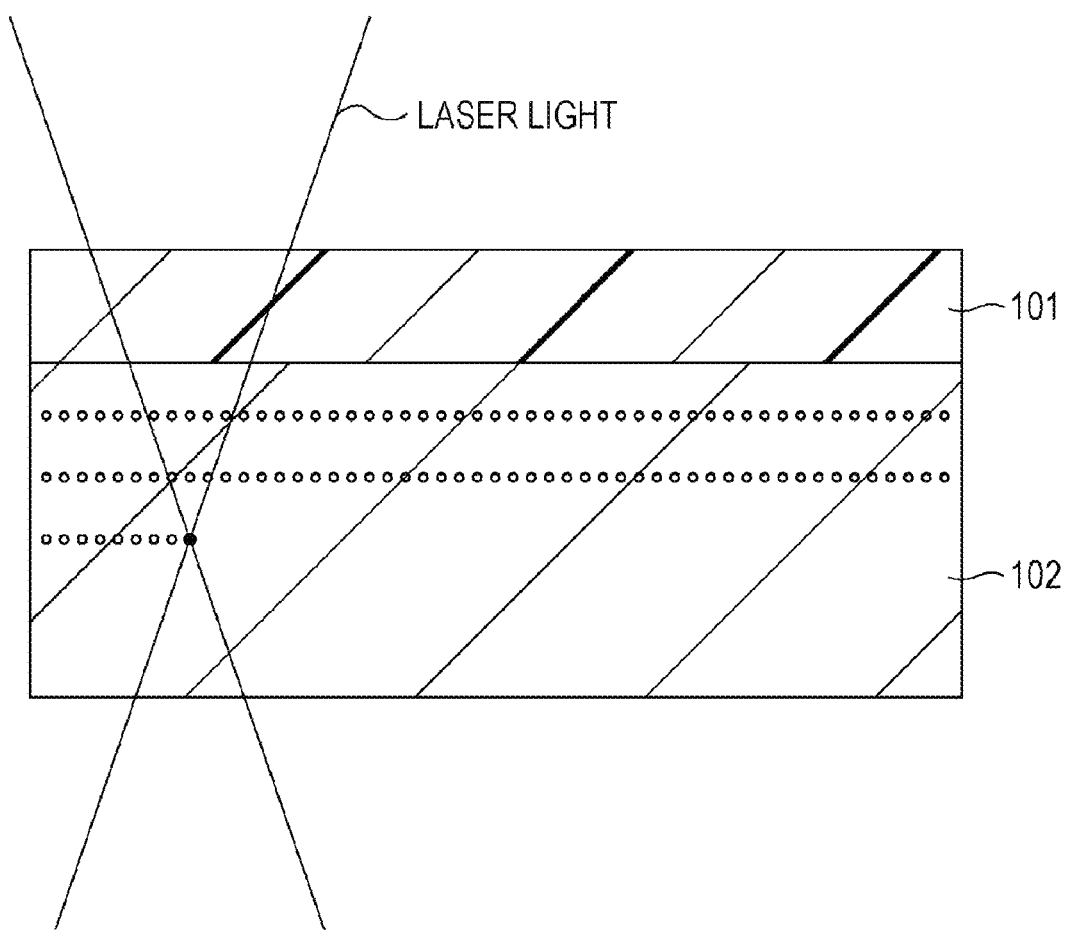
FIG. 11 is a diagram illustrating a bulk recording method.
Figure 12A:
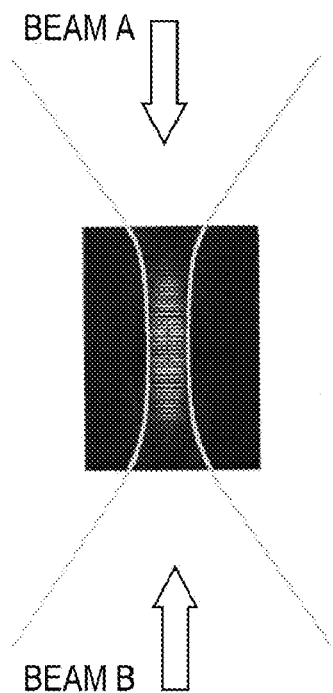
FIGS. 12A and 12B are diagrams illustrating a microhologram method.
Figure 12B:
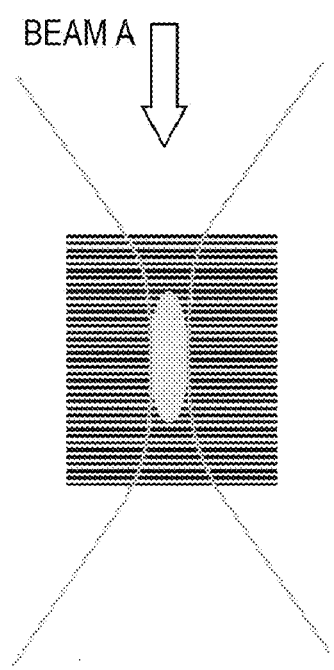
Figure 13A:
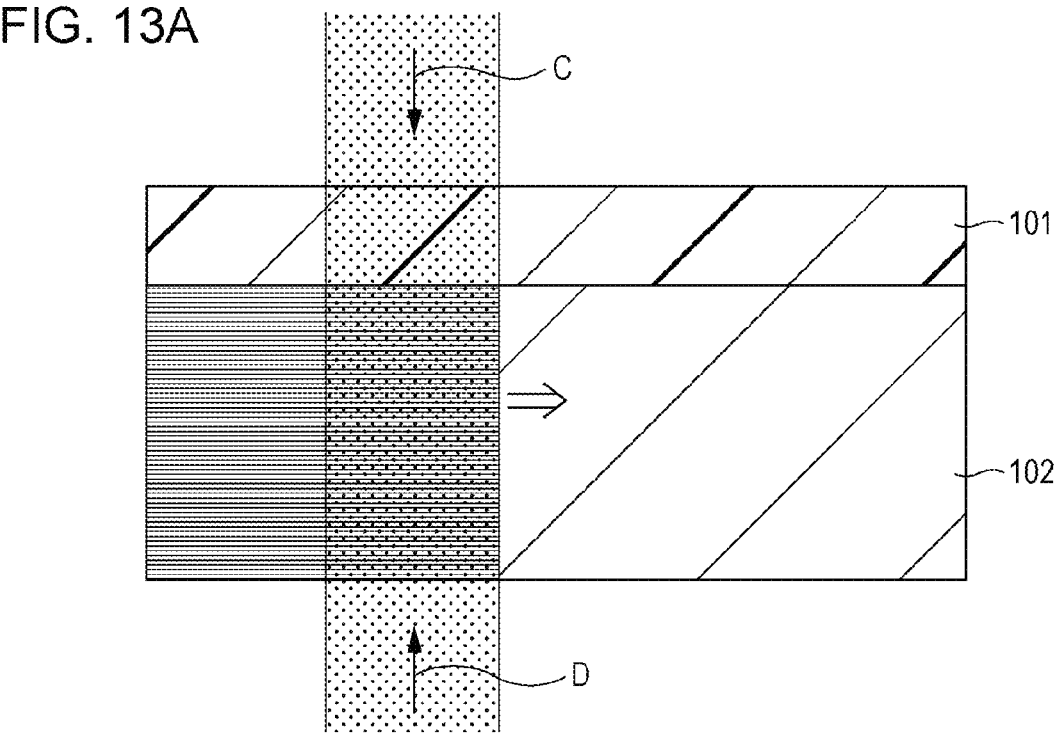
FIGS. 13A and 13B are diagrams illustrating negative-type microhologram methods.
Figure 13B:
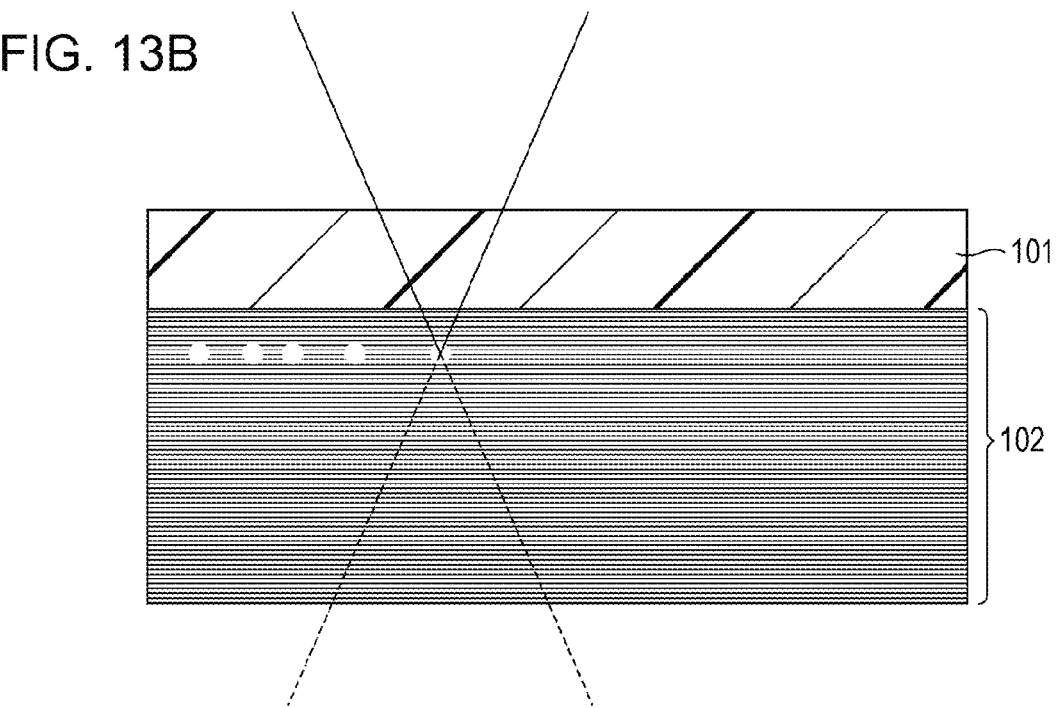
Figure 14:
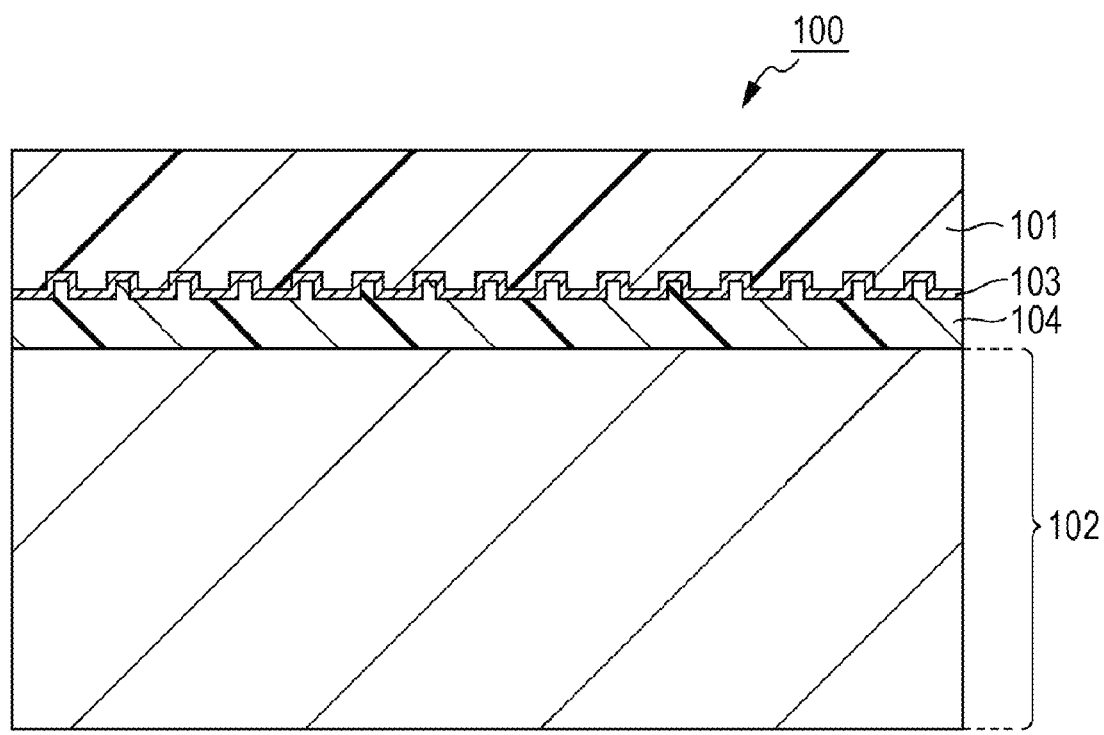
FIG. 14 is a diagram illustrating a cross-sectional structure of an actual bulk-type recording medium having a reference surface.
Figure 15:
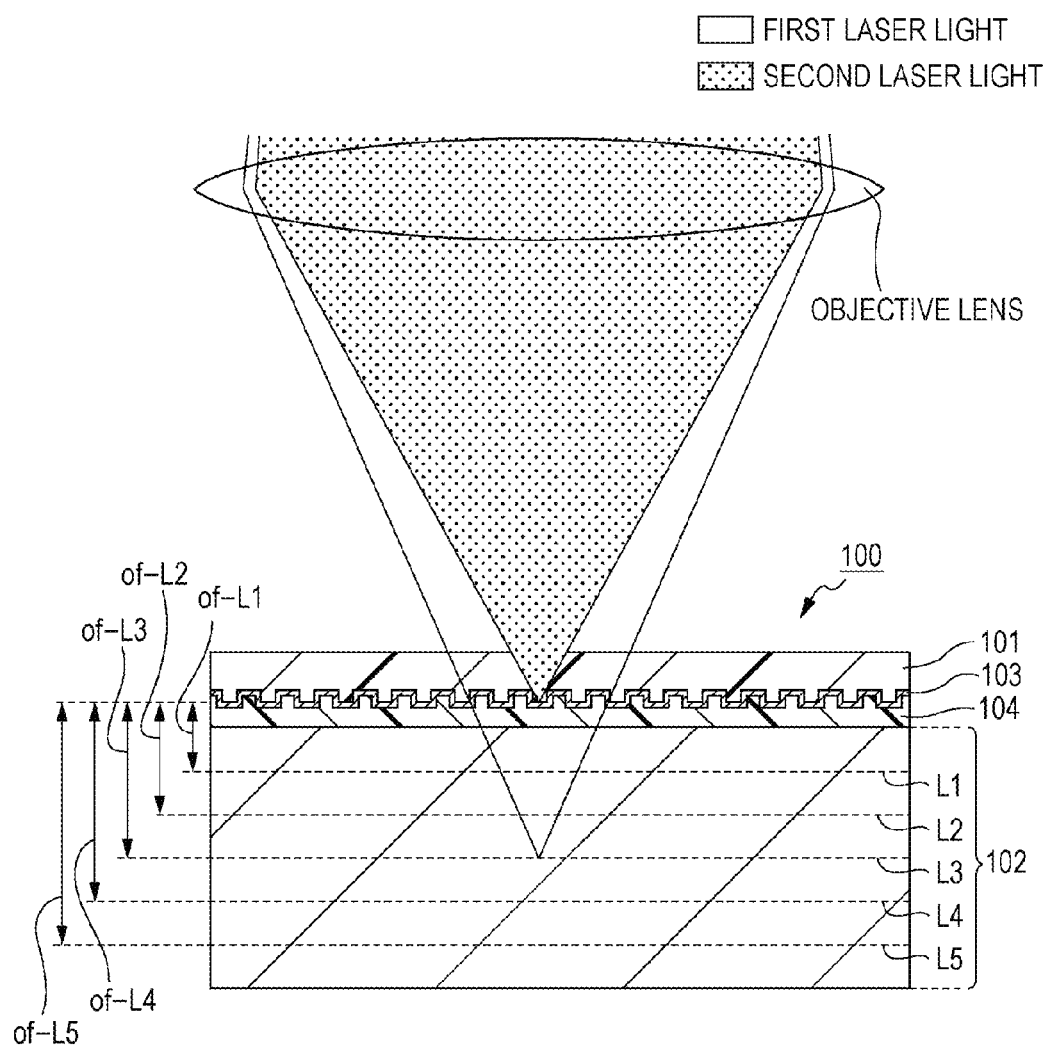
FIG. 15 is a diagram illustrating operations performed during recording of marks in the bulk-type recording medium.
Figure 16:
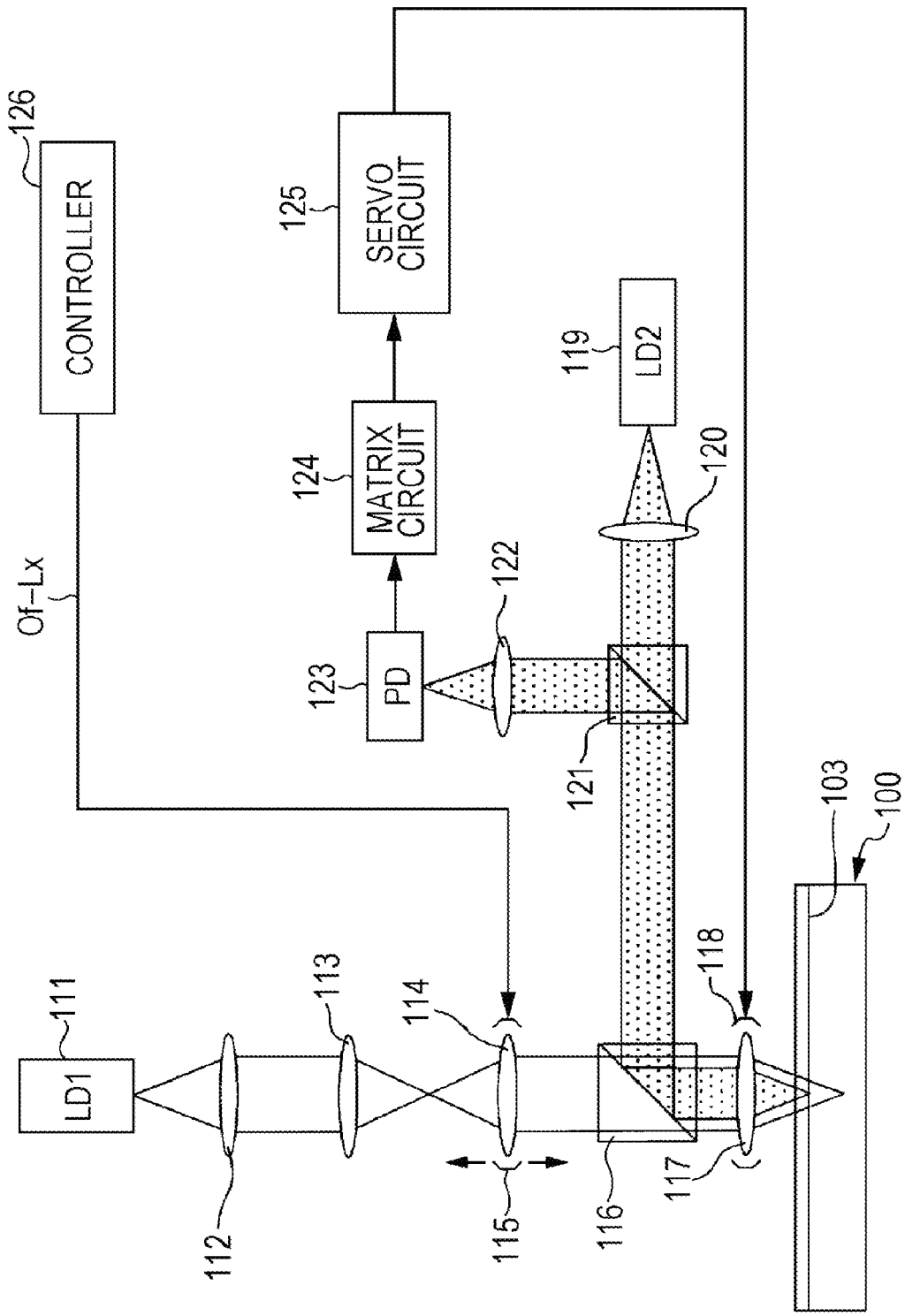
FIG. 16 is a diagram illustrating an internal configuration of a recording apparatus which performs recording on a bulk-type recording medium according to the related art.

FIGS. 10A and 10B are flowcharts illustrating flows of processes to be performed by the controller 27 to realize techniques for acquitting the eccentricity estimation amount d-imt and for correcting the information recording position based on the value of the acquired eccentricity estimation amount d-imt according to the embodiment.

FIG. 10A represents a flow of processes to be performed in response to the acquisition (generation of the rotation angle-eccentricity amount correspondence information) of the eccentricity estimation amounts d-imt within one revolution of the disc. FIG. 10B represents a flow of processes to be performed in response to the correction of the information recording position based on the value of the acquired eccentricity estimation amount d-imt.

Moreover, the processes illustrated in FIGS. 10A and 10B are performed by the controller 27 on the basis of the programs stored in, for example, an internal memory (such as the above-mentioned ROM).

First, with regard to FIG. 10A, in Step S101, an instruction for executing the focus servo and tracking servo is performed.

As described above, in this example, the acquisition of the eccentricity estimation amount d-imt is performed during the startup operation. Therefore, the process of Step S101 in this case corresponds to a process of performing the instruction for executing the focus servo control and the tracking servo control on the servo circuit 25 during the startup operation.

In addition, subsequently, in Step S102, a process of acquiring the eccentricity estimation amount d-imt for one rotation is performed. That is, in the state where the focus and tracking servo control is performed according to the process of Step S101, the rotation angle information detected by the position information detecting unit 26 and the value of the eccentricity estimation amount d-imt calculated by the servo circuit 25 are acquired to generate the rotation angle-eccentricity amount correspondence information illustrated in FIG. 8 to be stored in, for example, the internal memory.

As the process of Step S102 is performed, the processes illustrated in FIG. 10A are ended.

In addition, as understood from the description provided with reference to FIG. 5, the eccentricity estimation amount d-imt (the eccentricity amount d calculated on the basis of Expression 5) is on the premise that the control target value r of the tracking servo is 0. Therefore, the tracking servo control during the calculation of the eccentricity amount d-imt is performed to achieve the target value of r=0 (that is, imparting an offset to the focus servo loop is not performed).

That is, when the calculation of the eccentricity estimation amount d-imt is performed as the process of Step S102 is performed, the servo circuit 25 does not impart an offset to the tracking servo loop by setting the input value of the multiplying unit 34 to 0 (or by not performing a subtraction process using the subtracting unit 33).

Subsequently, in FIG. 10B, in Step S201, a standby state is made until a trigger for starting recording is generated. That is, for example, a process of determining whether or not a predetermined condition in which a recording starting command is generated or recording has to be started in advance is formed (a predetermined trigger is generated) is repeatedly performed until a positive result is obtained.

In addition, in the case where the positive result is obtained as the trigger for starting recording is generated, in Step S202, a process of applying the eccentricity estimation amount d-imt corresponding to a current rotation angle to the servo circuit 25 is performed.

That is, on the basis of the rotation angle information supplied from the position information detecting unit 26, the value of the eccentricity estimation amount d-imt corresponding to the rotation angle of the current bulk-type recording medium 1 is read out from the rotation angle-eccentricity amount correspondence information stored by the process of FIG. 10A, and the value is output to the servo circuit 25 (multiplying unit 34).

Subsequently, in Step S203, whether or not a trigger for ending recording is generated is determined. That is, whether or not a predetermined condition in which data to be recorded is completely recorded or a recording stopping command is generated is formed (a predetermined trigger is generated).

In Step S203, when the trigger for ending recording is not generated and thus a negative result is obtained, the preceding Step S202 is performed to apply the eccentricity estimation amount d-imt corresponding to the current rotation angle to the servo circuit 25. That is, while the recording operation is performed, by repeating the processes of Steps S202 and S203, correction of the information recording position based on the value of the eccentricity estimation amount d-imt corresponding to the rotation angle of the current bulk-type recording medium 1 is continuously performed.

In addition, in Step S203, when the trigger for ending recording is generated and thus a positive result is obtained, the processes illustrated FIG. 10B are ended.

4-5. Conclusion of Embodiment

In this embodiment described above, in the case where the configuration is employed in which the first and second laser lights are illuminated via the common objective lens 17, the focus servo control of the objective lens 17 is performed to focus the second laser light on the reference surface Ref (selective reflection film 3) formed in the bulk-type recording medium 1, the information recording position (the focal position) of the first laser light is set by changing the collimation of the first laser light incident on the objective lens 17, and the tracking servo control of the objective lens 17 is performed to allow the focal position of the second laser light to follow the guiding groove provided in the reference surface in the bulk-type recording medium 1, the eccentricity estimation amount d-imt is acquired for each rotation angle within one revolution of the disc. In addition, during recording, an offset based on the information on the eccentricity estimation amount d-imt acquired as described above is applied to the tracking error signal TE.

Accordingly, deviation of the information recording position accompanied by eccentricity of the bulk-type recording medium 1 can be appropriately corrected for each rotation angle of the disc.

By appropriately correcting the deviation of the information recording position as described above, the track pitches (the intervals between the guiding grooves formed in the tracking direction) can be closed-up, thereby achieving an increase in recording capacity.

In addition, according to this embodiment described above, the bulk-type recording medium 1 is allowed to be removable. Therefore, it is possible to prevent the compromising of convenience that occurs in the case where a system in which a disc such as a hard disc drive (HDD) is not removable is employed.

5. Modified Example

While the exemplary embodiments of the invention have been described above, the invention is not limited to the foregoing specific examples.

For example, in the foregoing description, the correction of the information recording position of the first laser light is performed by applying the offset in response to the eccentricity estimation amount d-imt to the tracking error signal TE. However, an offset may be applied to any position in the tracking servo loop, such as, to the tracking servo signal TS or to a drive signal for driving the biaxial actuator 18 (tracking coil).

Otherwise, the correction of the information recording position may be performed by, as well as the technique for applying the offset in response to the eccentricity estimation amount d-imt to the tracking servo loop, a technique for moving the bulk-type recording medium 1 in response to the eccentricity estimation amount d-imt, a technique for moving the entire optical system in response to the eccentricity estimation amount d-imt, and the like.

According to the embodiment of the invention, the specific configuration of the recording position correcting unit is not particularly limited as long as the recording position correcting unit is configured to correct the deviation of the information recording position in the tracking direction due to eccentricity of the disc.

In addition, in the foregoing description, measurement (estimation) of the eccentricity amount is performed on the basis of the tracking servo signal TS. However, the technique for estimating the eccentricity amount is not limited to this.

For example, as disclosed in Japanese Unexamined Patent Application Publication No. 2008-140420, the estimation of the eccentricity amount may be performed using only the tracking error signal TE (the tracking error signal TE in a traverse state).

Otherwise, the estimation of the eccentricity amount may be performed on the basis of the signal for driving the biaxial actuator 18 (tracking coil).

In addition, although not particularly mentioned in the foregoing description, the estimation of the eccentricity amount for each rotation angle within one revolution of the disc may be performed on only a predetermined single point on the bulk-type recording medium 1 or on a plurality of points.

Here, there may be a case where the amount of eccentricity varies in radial positions of the disc. Thus, a plurality of areas is marked on the bulk-type recording medium 1 in the radial direction, and estimation of the eccentricity amount is performed on each area. In this case, the estimation of the eccentricity amounts of the areas may be collectively performed during a startup operation or the like or may be sequentially performs whenever each area is passed during recording. In the former case, the correction of the information recording position is performed by changing the value of the eccentricity estimation amount d-imt being used to a value of a corresponding area as the area is passed during recording. In the latter case, when a discrete area is reached during recording, the recording operation is suspended, and the process of acquiring the eccentricity estimation amount d-imt is performed to correct the information recording position using the information on the eccentricity estimation amounts d-imt acquired by the acquisition process in that area.

In addition, in the foregoing description, the case where the formation of the position guiding elements in the bulk-type recording medium 1 is performed by imparting the uneven cross-sectional pattern such as grooves or pit rows is exemplified. However, the position guiding elements included in the optical disc recording medium according to the embodiment of the invention may be formed by other techniques such as a technique for recording mark rows.

In the foregoing description, the case where the reference surface Ref of the bulk-type recording medium 1 is formed on the upper layer side of the bulk layer 5 is exemplified. However, the embodiment of the invention may be suitably applied to a case where the reference surface Ref is formed on the lower layer side of the bulk layer 5.

In addition, in the foregoing description, the case where the recording apparatus according to the embodiment of the invention is applied to a recording-dedicated apparatus only for recording information using illumination of the first light is exemplified. However, the embodiment of the invention may be suitably applied to a recording and reproduction apparatus capable of reproducing recorded information using the illumination of the first light.

The present application contains subject matter related to that disclosed in Japanese Priority Patent Application JP 2009-276155 filed in the Japan Patent Office on Dec. 4, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A recording apparatus to perform information recording using formation of marks by focusing a first light with an objective lens at a given position in a recording layer included in an optical disc recording medium, the recording apparatus comprising:
- a rotation driving unit to rotate the optical disc recording medium;
- a focus servo control unit to condense a second light which is different from the first light via the objective lens on a reflection film provided with a position guiding element in the optical disc recording medium, and to control a position of the objective lens so that the second light is focused on the reflection film at least in part on the basis of the reflected light of the second light condensed on the reflection film;
- a recording position setting unit to set an information recording position of the first light in a focus direction by changing a collimation of the first light incident on the objective lens;
- a tracking servo control unit to control a position of the objective lens to allow a focal position of the second light to follow the position guiding element at least in part on the basis of the reflected light of the second light;
- an eccentricity amount estimating unit, coupled to the optical disc recording medium, to estimate an eccentricity amount of the optical disc recording medium; and
- an eccentricity estimation amount acquisition control unit, coupled to the eccentricity amount estimating unit and rotation driving unit, to acquire an eccentricity estimation amount for each rotation angle within one revolution of the disc by rotating the optical disc recording medium and performing an operation of estimating the eccentricity amount using the eccentricity amount estimating unit.

2. The recording apparatus according to claim 1, further comprising a recording position correcting unit to correct the information recording position of the first light for each rotation angle at least in part on the basis of the eccentricity estimation amount.

3. The recording apparatus according to claim 1, wherein the eccentricity amount estimating unit estimates the eccentricity amount at least in part on the basis of tracking error information, which is obtained by sensing the reflected light of the second light.

4. The recording apparatus according to claim 3, wherein the eccentricity amount estimating unit obtains as the eccentricity estimation amount, a sum of a tracking error signal, which is obtained by sensing the reflected light of the second light, and a signal obtained by imparting response characteristics of an actuator that drives the objective lens to a tracking servo signal generated at least in part on the basis of the tracking error signal.

5. The recording apparatus according to claim 2, wherein the recording position correcting unit corrects the information recording position by applying an offset in response to the eccentricity estimation amount to a tracking servo loop realized by the tracking servo control unit.

6. The recording apparatus according to claim 2, wherein the recording position correcting unit corrects the information recording position by changing a correction amount for each rotation angle in response to a radial position of the information recording position.

7. The recording apparatus according to claim 6, wherein:
the eccentricity estimation amount acquisition control unit acquires the eccentricity estimation amount for each rotation angle at a different radial position by performing the operation of estimating the eccentricity amount on a plurality of radial positions on the optical disc recording medium using the eccentricity amount estimating unit, and
the recording position correcting unit performs correction according to the radial position of the information recording position at least in part on the basis of the eccentricity estimation amount for each rotation angle at the different radial position.

8. The recording apparatus according to claim 1, wherein rotation angle information is recorded in the optical disc recording medium by an uneven cross-sectional formation pattern to be applied to the reflection film,
an information detecting unit to detect the rotation angle information by sensing the reflected light of the second light reflected from the reflection film is provided, and
the eccentricity estimation amount acquisition control unit acquires the eccentricity estimation amount for each rotation angle at least in part on the basis of the eccentricity estimation amount and the rotation angle information, which are respectively obtained by the eccentricity amount estimating unit and the information detecting unit while the optical disc recording medium is rotated.

9. A control method used in a recording apparatus comprising:
performing information recording using formation of marks by focusing a first light with an objective lens at a given position in a recording layer included in an optical disc recording medium, rotating by a rotation driving unit the optical disc recording medium, condensing by a focus servo control unit a second light which is different from the first light, via the objective lens on a reflection film provided with a position guiding element in the optical disc recording medium, and controlling a position of the objective lens so that the second light is focused on the reflection film on the basis of the reflected light of the second light condensed on the reflection film, setting by a recording position setting unit an information recording position of the first light in a focus direction by changing a collimation of the first light incident on the objective lens, controlling by a tracking servo control unit a position of the objective lens to allow a focal position of the second light to follow the position guiding element at least in part on the basis of the reflected light of the second light, and
acquiring by an eccentricity estimation amount acquisition control process an eccentricity estimation amount for each rotation angle within one revolution of a disc by rotating the optical disc recording medium and performing an operation of estimating the eccentricity amount using an eccentricity amount estimating unit for estimating the eccentricity amount of the optical disc recording medium.

* * * * *